US008880436B2

(12) United States Patent
Chan

(10) Patent No.: US 8,880,436 B2
(45) Date of Patent: Nov. 4, 2014

(54) AUTOMATION SYSTEM AND METHOD FOR A WEB-BASED IMPLEMENTATION PORTAL

(75) Inventor: Louisa Yuk Ling Chan, Central (HK)

(73) Assignee: The Hong Kong and Shanghai Banking Corporation Limited, Hong Kong (HK)

(*) Notice: Subject to any disclaimer, the term of this patent is extended or adjusted under 35 U.S.C. 154(b) by 1162 days.

(21) Appl. No.: 12/710,091

(22) Filed: Feb. 22, 2010

(65) Prior Publication Data
US 2010/0280962 A1 Nov. 4, 2010

Related U.S. Application Data

(60) Provisional application No. 61/154,639, filed on Feb. 23, 2009.

(51) Int. Cl.
G06Q 10/00 (2012.01)
G06Q 10/10 (2012.01)
(52) U.S. Cl.
CPC .............. G06Q 10/10 (2013.01); G06Q 10/103 (2013.01)
USPC ....................................................... 705/301
(58) Field of Classification Search
CPC ............................. G06Q 10/10; G06Q 10/103
USPC .................................................. 705/1.1, 301
See application file for complete search history.

(56) References Cited

U.S. PATENT DOCUMENTS 6,581,068 B1* 6/2003 Bensoussan et al. .................. 1/1
7,177,834 B1* 2/2007 Maestle .......................... 705/38
8,204,809 B1* 6/2012 Wise .............................. 705/35
2004/0019493 A1* 1/2004 Townsend et al. ................. 705/1
2007/0250295 A1* 10/2007 Murray et al. ..................... 703/2
2008/0004927 A1 1/2008 Haller et al.
2008/0103911 A1 5/2008 Singh et al.
2008/0120129 A1* 5/2008 Seubert et al. .................... 705/1
2008/0294479 A1* 11/2008 Emling et al. .................... 705/7
2009/0125359 A1* 5/2009 Knapic et al. .................... 705/8

FOREIGN PATENT DOCUMENTS

EP 1 494 429 A2 1/2005
WO WO 2008/021690 A2 2/2008

OTHER PUBLICATIONS

Market Development—International Expansion: Flying the nest. Cards International (Apr. 26, 2006): 14-17.*
Search Report from Singapore Patent Application No. 201001250-8, issued Aug. 4, 2011.
Replaced Written Opinion from Singpore Patent Application No. 201001250-8, issued Sep. 22, 2011.

* cited by examiner

Primary Examiner — Amanda Kirlin
(74) Attorney, Agent, or Firm — Stroock & Stroock & Lavan LLP

(57) ABSTRACT

Online collaboration through a web portal facilitates effective communication among all parties, regardless of their geographical and organizational boundaries. With the disclosed web-based implementation portal, project implementation according to various embodiments of the present invention, is no longer an abstract list of service pledges by banks. Companies can visualize at each stage exactly how a solution will be implemented for them. In some embodiments, through embedded workflow steps and pre-defined templates, the portal can standardize and automate the customer onboarding process. The process can be standardized and automated from the time the customer confirms subscription to specific commercial solutions to the time when these commercial products are implemented and used by the customer.

48 Claims, 24 Drawing Sheets

| Project Tracker | | | | | | | | | | | |
|---|---|---|---|---|---|---|---|---|---|---|---|
| My Issue / Risk / Task | All Issue / Risk / Task | Issue Report | | | | | | | | | Filtering Option |

Issue

New Issue

Filtering Option

Severity: High

Status: Open

Nature: Implementation

Type: Issue

Confirm  Cancel

| Id | Issue Name | Type | Severity | Client Visibility | Nature | Category | Status |
|---|---|---|---|---|---|---|---|
| 1 | Incident 1 | Issue | Medium | No | Implementation | Enhancement | Open |
| 2 | (New Issue) | Issue | Medium | No | Integration | Enhancement | Open |
| 3 | Discuss ECMA Documentation | Risk | Medium | No | Implementation | Enhancement | Open |
| 4 | Discuss COS Service Request Form | Risk | Medium | No | Implementation | Enhancement | Open |

1-4 of 4

Task List

Add

| Id | Task Name | Proposed Start Date | Proposed End Date | Actual Start Date | Status | Client Visibility | Owner | Reference |
|---|---|---|---|---|---|---|---|---|
| 1 | Task 1 | 02/12/2007 | 25/12/2007 | 02/12/2007 | Open | No | Frances Chan | Project Plan |

1-1 of 1

| Date of Report | 01-Nov-09 | Generation Frequency | Monthly |
| --- | --- | --- | --- |
| Scope | Country - Australia | Region | Asia Pacific |

Management Dashboard Report

Post-Implementation Activities of YTD completed deals

| | Count | No. of Deals | % |
| --- | --- | --- | --- |
| No. of PIS Received | 6 | 6 | 100.00% |
| No. of Testimonials Received | 0 | 0 | 0.00% |
| No. of Client Reference Obtained | 0 | 0 | 0.00% |

FNR of YTD & Last Year Completed Deals

| | | | 2008 | | 2009 | |
| --- | --- | --- | --- | --- | --- | --- |
| | No. of Deals | % | No. of Deals | % | No. of Deals | % |
| Closed and Not Required | 0 | 0.00% | 0 | 0.00% | 0 | 0.00% |
| Closed and Realized | 0 | 0.00% | 0 | 0.00% | 0 | 0.00% |
| Tracking in Progress | 0 | 0.00% | 0 | 0.00% | 0 | 0.00% |
| Total | 0 | 0.00% | 0 | 0.00% | 0 | 0.00% |

Figure 18

FNR of YTD & Last Year Completed Deals

2009 Completed Deals In Tracking Status

| Deals Completion Month | No. of Deals | FNR Accumulated (USD'000s) | FNR Annualised (USD'000s) | EBV (USD'000s) | % Realisation |
|---|---|---|---|---|---|
| Jan | 0 | 0.00 | 0.00 | 0.00 | 0.00% |
| Feb | 0 | 0.00 | 0.00 | 0.00 | 0.00% |
| Mar | 0 | 0.00 | 0.00 | 0.00 | 0.00% |
| Apr | 0 | 0.00 | 0.00 | 0.00 | 0.00% |
| May | 0 | 0.00 | 0.00 | 0.00 | 0.00% |
| Jun | 0 | 0.00 | 0.00 | 0.00 | 0.00% |
| Jul | 0 | 0.00 | 0.00 | 0.00 | 0.00% |
| Aug | 0 | 0.00 | 0.00 | 0.00 | 0.00% |
| Sep | 0 | 0.00 | 0.00 | 0.00 | 0.00% |
| Oct | 0 | 0.00 | 0.00 | 0.00 | 0.00% |
| Nov | 0 | 0.00 | 0.00 | 0.00 | 0.00% |
| Dec | 0 | 0.00 | 0.00 | 0.00 | 0.00% |
| Total | 0 | 0.00 | 0.00 | 0.00 | N/A |

2008 Completed Deals In Tracking Status

| Deals Completion | No. of Deals | FNR Accumulated (USD'000s) | FNR Annualised (USD'000s) | EBV (USD'000s) | % Realisation |
|---|---|---|---|---|---|
| Total | 35 | 0.00 | 0.00 | 1,193.00 | 0.00% |

AUTOMATION SYSTEM AND METHOD FOR A WEB-BASED IMPLEMENTATION PORTAL

RELATED APPLICATIONS

This application claims priority under 35 U.S.C. §119(e) to U.S. Application Ser. No. 61/154,639, entitled, Web-Based Portal Providing Real-Time Collaboration for Integrated Project, Workflow and Document Management, filed on Feb. 23, 2009, the entire contents of which are incorporated by reference.

FIELD OF THE INVENTION

The present disclosure relates to systems and methods for an automation methodology used in a web based implementation portal.

BACKGROUND OF THE INVENTION

What continues to confound many corporate treasuries is the difficulty in assessing a bank's abilities in implementing a proposed solution in a seamless and consistent manner across all countries. In the past, when banking products were subscribed to and implemented on a standalone basis, it was sufficient for banks to focus on ensuring documentation was executed, the service set-up was completed and the customer trained in its use. As solutions have become increasingly complex and integrated across the full range of cash management products, implementation has become more than just an efficient execution process. Success demands a proactive and consultative engagement with the customer as well as robust project management skills. Companies have begun to realize that the more complex the solution and the wider the geographical reach, the more critical the need for an accurate assessment of the bank's implementation resources, processes and methods.

With the increasing number of companies that have either centralized or outsourced parts of their business processes, implementing a new cash management solution can involve many parties outside the organization and across the globe. Added to that are the complexities of today's cash management solutions and the need to integrate them into a company's processes. It is not difficult to imagine how a company and its various subsidiaries, its vendors and its customers can all be affected by a new system. New bank accounts, an Internet banking platform and interfaces with enterprise resource planning systems all entail development and process changes. With different stakeholders come different objectives, perceptions and motivations, some of them conflicting, which further challenges the implementation process. Managing such changes then becomes key to achieving a successful implementation. Furthermore, the fluid business environment that companies currently operate in can sometimes cause unexpected changes to cash management requirements. The implementation process must be able to respond quickly to these changes in project scope and timelines, and the impact should be easy to identify and measure. Given the above, it is apparent that the traditional approach of focusing on execution to deliver solutions will no longer suffice. We have determined that there is a need to embrace a collaborative process that focuses on the customer, seeks to understand how the solution affects the company and its stakeholders and/or customers/clients and/or users, and makes the process of change more manageable.

A critical element in making this collaborative step is efficient information exchange among all parties involved in the end-to-end implementation process. For example, a client or customer and company (e.g., bank) personnel (and also those from any third party vendors involved) not only require access to a single and shared source of project information, but also to dynamic project management tools that facilitate the management of project tasks, issues and risks and progress tracking

SUMMARY OF THE INVENTION

Online collaboration through a web portal facilitates effective communication among all parties, regardless of their geographical and organizational boundaries. With the disclosed web-based implementation portal, project implementation according to various embodiments of the present invention, is no longer an abstract list of service pledges by banks Companies can visualize at each stage exactly how a solution will be implemented for them.

In some embodiments, through embedded workflow steps and pre-defined templates, the portal can standardize and automate the customer onboarding process. The process can be standardized and automated from the time the customer confirms subscription to specific commercial solutions to the time when these commercial products are implemented and used by the customer.

In some embodiments, based on the countries and products selected by the user, the portal can automatically generate project plans, legal agreements, customer onboarding materials, company and customer checklists, file interface test cases, customer training materials and company service setup workflows. Each of these functions can contain core materials and steps of the onboarding process and can facilitate the efficient management of tasks throughout the process.

In some embodiments, the system includes various functions within the system that will allow the users to call for actions. The functions include Project Plan, Legal Documents, Training materials, Issue Tracker, Client Service Handover, Call Report, Post Implementation Review. All these actions can be viewed under the "My Tasks" function, in an action log. The action log corresponds to a set of actions that can be embedded within each of the above-mentioned functions. These functions represent some of the core workflow/ steps of the onboarding process. The action log, for example an issue tracker or a task list, together with the project plan, can facilitate users to register actions that arise during the workflow of a project. For example, key information within the action log and the project plan i.e. start date, due date, responsible party and comments from these functions are consolidated and synchronized with the summary page, personal work schedulers (my tasks), internal and external progress reports, project dashboard and vice versa.

In some embodiments, for each of the products of a particular country, templates on project plans, legal agreements, customer onboarding materials, company and customer checklists, file interface test cases, customer training materials and company service setup workflow are pre-defined and configured in the system. While each function has unique features of its own, the generation methodology is consistently based on country and product.

In some embodiments, the portal system is accessible by company staff and customers through intranet and internet respectively.

DESCRIPTION OF THE FIGURES

Various objects, features, and advantages of the present invention can be more fully appreciated with reference to the following detailed description of the invention when considered in connection with the following drawings, in which like reference numerals identify like elements

FIG. 5 is a screenshot of an EBV spreadsheet of the web-based implementation portal, according to embodiments of the present disclosure;

FIG. 9 is a screenshot of a legal document function of the web-based implementation portal, according to embodiments of the present disclosure;

FIG. 17 is a screenshot of a project tracker of the web-based implementation portal, according to embodiments of the present disclosure;

FIGS. 18-21 are portions of a management dashboard report, according to embodiments of the present disclosure.

FIG. 22 is a screenshot of a project dashboard function of the web-based implementation portal, according to embodiments of the present disclosure.

DETAILED DESCRIPTION

Figure 1:
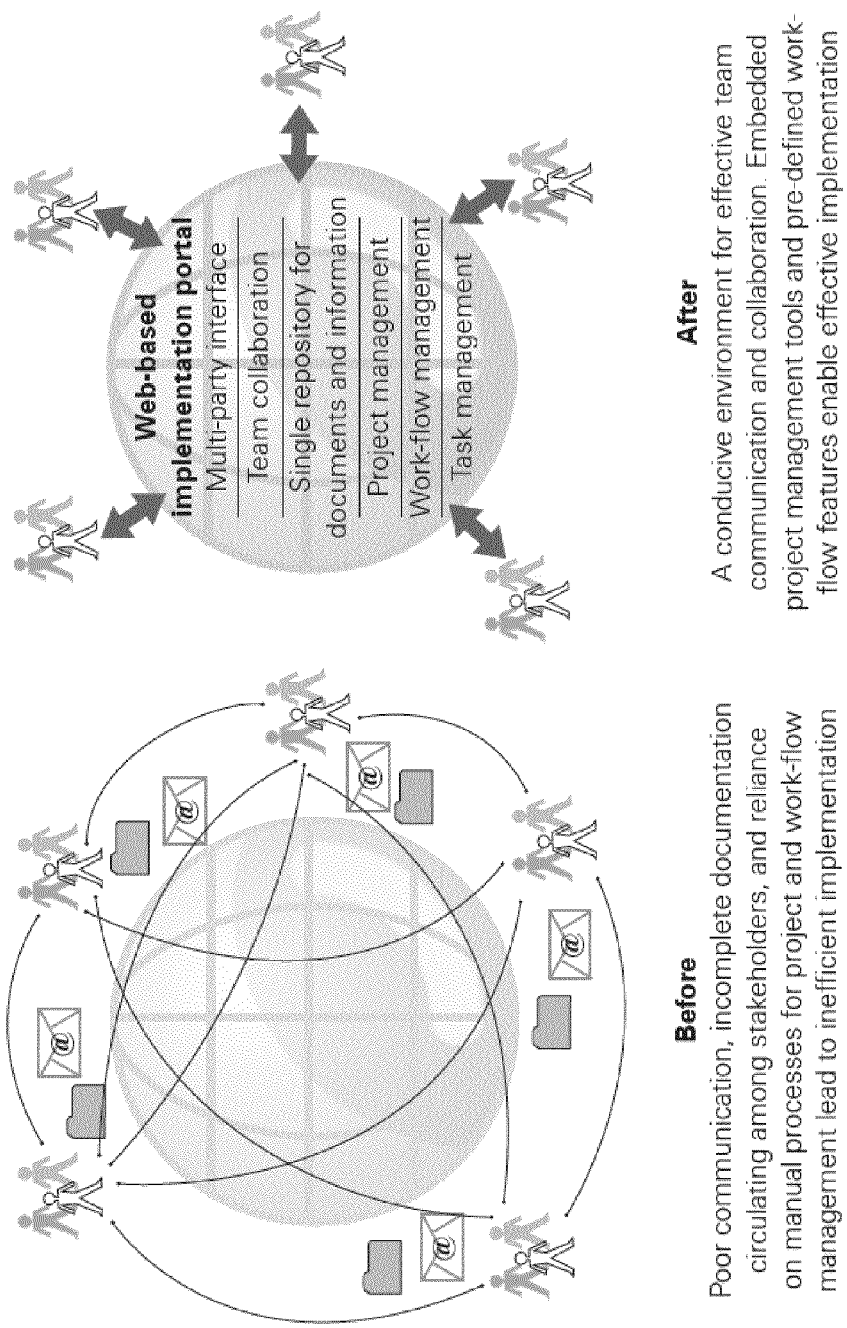
FIG. 1A depicts prior art implementation portal.
FIG. 1B depicts a web-based implementation portal, according to embodiments of the present disclosure.

In some embodiments, through embedded workflow steps and pre-defined templates, the portal can standardize and automate the customer onboarding process. The process can be standardized and automated from the time the customer confirms subscription to specific commercial solutions to the time when these commercial products are implemented and used by the customer.

In some embodiments, based on the countries and products selected by the user, the portal can automatically generate project plans, legal agreements, customer onboarding materials, company and customer checklists, file interface test cases, customer training materials and company service setup workflows. Each of these functions can contain core materials and steps of the onboarding process and can facilitate the efficient management of tasks throughout the process.

In some embodiments, an action log can be embedded within each of the following functions: legal agreements, customer training, issue tracker, call report, client service handover and post implementation review. These functions represent some of the core workflow/steps of the on-boarding process. The action log, for example an issue tracker or a task list, together with the project plan, can facilitate users to register actions that arise during the workflow of a project. For example, key information within the action log and the project plan i.e. start date, due date, responsible party and comments from these functions are consolidated and synchronized with the summary page, personal work schedulers (my tasks), internal and external progress reports, project dashboard and vice versa.

In some embodiments, for each of the products of a particular country, templates on project plans, legal agreements, customer onboarding materials, company and customer checklists, file interface test cases, customer training materials and company service setup workflow are pre-defined and configured in the system. While each function has unique features of its own, the generation methodology is consistently based on country and product.

In some embodiments, the portal system is accessible by company staff and customers through intranet and internet respectively.

The described web automation methodology in an implementation portal provides a global client on-boarding platform that enables solution delivery to be managed collaboratively amongst internal staff and clients. Specifically, the end-to-end implementation processes embedded in the system are automated, streamlined and standardized, thereby enabling the delivery of a swift, seamless and consistent experience to clients across geographies. The system allows, for example, cash management solutions to be delivered in a consistent manner, irrespective of customer location. Core to the system are standardized, yet customizable, features. The portal embodies the ideal customer experience, all the way from the formulation of solution, to implementation and ongoing service beyond implementation. With this system, project implementation is no longer an abstract list of service pledges made by a bank. Instead, companies can visualize at each stage exactly how the solution will be implemented. Throughout the disclosure the terms system and portal will be used interchangeably.

The described web-based portal provides, in some embodiments, a repository for all project activities, communications, and documents created throughout the implementation process, making them easily accessible to all stakeholders regardless of location and organization. It allows a common view of the project status, thereby eliminating misunderstandings and reducing time spent on communication. Communication with the disclosed system is no longer a one-way process—it becomes multilateral. Team collaboration can be encouraged via an online forum that can include third parties, such as client vendors. This dynamic implementation work flow allows the right information to be captured and passed from one party to another based on their assigned roles, thus enhancing information flow and ensuring the job is done accurately in the first attempt.

Through the use of the implementation portal, in some embodiments, project management is executed on a real-time, dynamic and collaborative basis, strengthening the accountability of all stakeholders and enabling project team members to focus on completing their respective tasks on time. Once the scope of the products and services to be implemented has been determined, the embedded project planning tool will generate a project plan using pre-defined templates based on the bank's extensive experience in implementing similar solutions. The plan can be further customized for individual needs and allows easy integration with a customer's internal tasks for a consolidated view and joint management of the entire process. In addition to real-time updates, the plan provides automated alerts and is tightly integrated with other implementation tools such as task management and issue-tracking. Since updates to individual tasks are reflected in the project plan on a real-time basis, their impact on critical paths can be easily and quickly assessed. If an important milestone slips, an automated notification will be triggered so that key project stakeholders can take prompt action.

While consolidating all interactions on a single platform is useful in accordance with some of the embodiments of the present invention, how this data is presented to provide actionable business insights also is important. Management by anticipation and exception, together with information on demand are the primary design principles driving the system development. So that stakeholders and/or customers focus on, for example, performing priority tasks and resolving issues, a link-enabled dashboard of key indicators, outstanding issues, slipped milestones and overdue tasks is provided so that stakeholders can quickly investigate the relevant details. This allows, in some embodiments, automatic escalation of outstanding items so any anomalies are promptly identified and resolved. For stakeholders and/or customers and/or users requiring more detailed presentations, regular progress reports are produced by, for example, automatic extraction of information from multiple sources in the system. In some embodiments, the progress reporting tool enables teams in geographically diverse locations to collaborate in the production of consolidated, accurate and timely progress reports.

For solutions involving multiple products and countries, the proliferation of documents and its management can prove to be a major challenge. To alleviate this problem, an online document repository in some embodiments enables documents to be categorized for easy retrieval by anyone, anywhere, at anytime. Similarly, the completion of legal agreements can absorb valuable implementation time and resources, for both client and/or user and company (e.g., bank). In some embodiments, the system addresses this by automatically populating the agreements with client information, as well as details of the services that the client is subscribing to, thereby minimizing errors and saving time for all concerned. To further assist customers, especially when a solution spans multiple products and countries involving diversely located signatories, the system advantageously provides detailed signing guidelines and enables online terms negotiation, task creation and progress tracking for each document. The level of detail provided eliminates lengthy communication, assists transparency and enables progress to be tracked and managed at an individual document level.

FIG. 1A depicts prior art implementation portal. This type portal results in poor communication, incomplete documentation circulating among stakeholders and/or customers and/or users, and reliance on manual processes for project and work-flow management leads to inefficient implementation FIG. 1B depicts a web-based implementation portal, according to embodiments of the present disclosure. The described portal creates an environment for effective team communication and collaboration. Further, as discussed below, embedded project management tools and pre-defined workflow features enable effective implementation. The web-based implementation portal provides a multi-party interface, a single repository for documents and information, project management, work-flow management, and task management.

Figure 2:
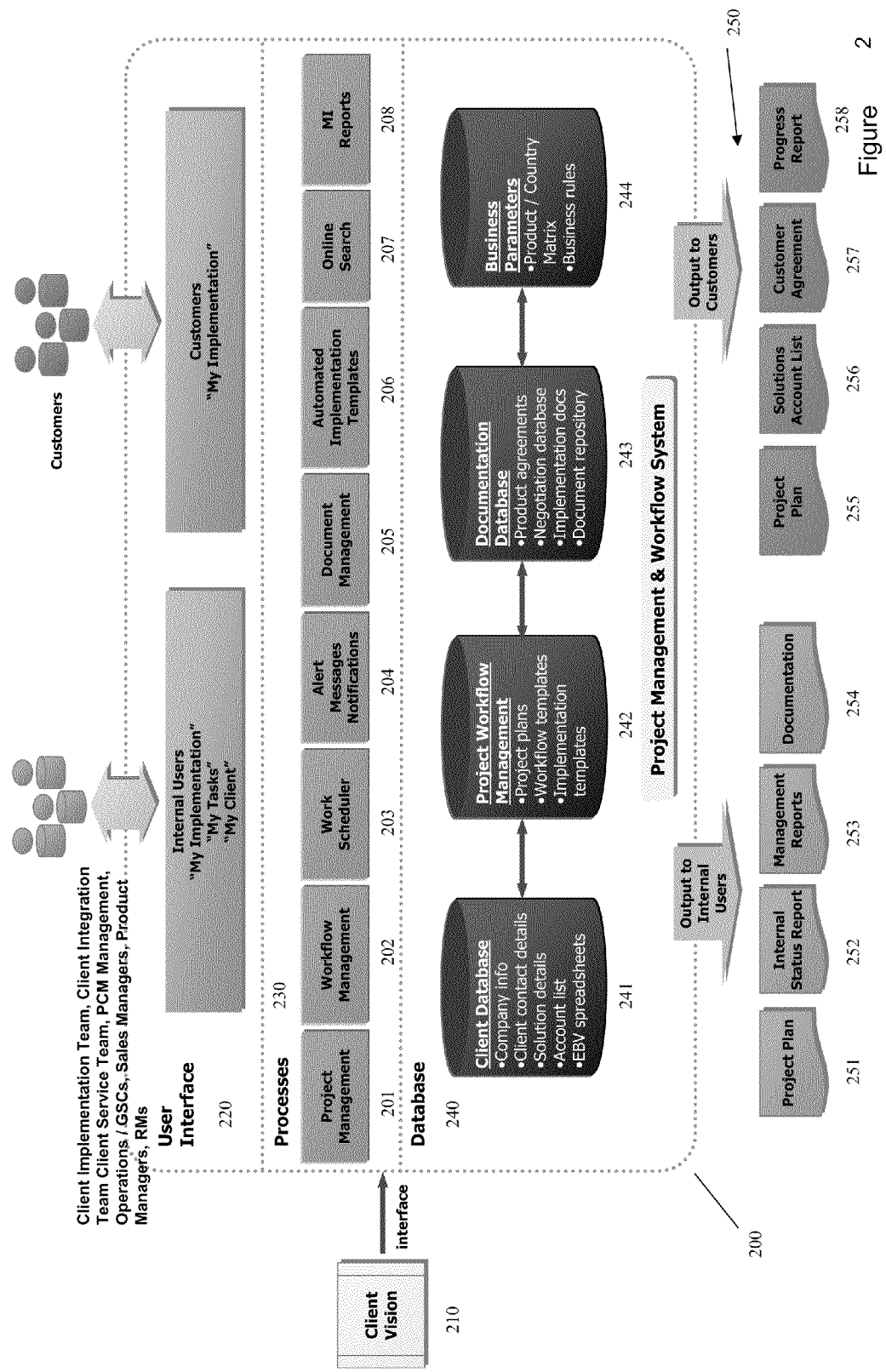
FIG. 2 is a diagram of a web-based implementation portal, according to embodiments of the present disclosure.

FIG. 2 is a diagram of a web-based implementation portal 200, according to embodiments of the present disclosure. The portal 200 includes user interface 220, processes 230, databases 240 and outputs 250 and is connected to client vision 210. The portal 200 is the entrance to the system through which the user is able to access the various system functions.

Client Vision

Client vision 210 is a name of a standard commercial platform outside of a bank and the client portal 200. Client vision is a customer information tool. For example, it can be a customer information management tool, a relationship management system, or a customer relationship management system. Client vision's 210 main function is to store customer information of the company (e.g., bank). In some embodiments, the bank established a communication channel with client vision 210. The bank using the portal 200 can download data from the client vision 210 databases to use that data in the portal databases.

User Interface Layer

The user interface 220 is the interface by which, for example, in some embodiments, both internal and external users can access the portal. For example, bank employees and agents are referred to as internal users, customers and clients are referred to as external users. All functions in the portal are accessible and used by the internal users except the following functions that are also accessible and used by external users, such as the bank's customers: (1) Dashboard (content available to Bank's customers are filtered and presented in a different way); (2) Project Plan; (3) Document Checklist; (4) Project Tracker; (5) Solution Matrix/Account List/Accounts & Services Schedule (6) Integration Test Management; (7) Progress Reports; and (8) Messaging, My Tasks.

In some embodiments, the interface is for internal users, which includes "My Implementation, "My Tasks" and "My Client." Internal users include users internal to the company (e.g., bank), for example, internal users can include client implementation teams, client integration teams, client service teams, payments/cash management operators, global service center operators, sales managers, product managers, and relationship managers. The internal users can interface with the system through a "My Implementation" page, a "My Tasks" page or a "My Client" page. Internal users, for example, including client implementation teams and client integration teams can manage the implementations through the "My Implementation" page. Operations that support system set up can receive job requests through the "My Task" page. Sales and client service teams can use the system for their respective handover processes and can access the portal 200 in a similar manner as the client implementation and integration teams. Together with the relationship managers, they will use the system to obtain regular updates on their clients. Other more sporadic users include, for example, payments/cash managers and product managers who can receive management information from the system. The disclosed portal can help project managers to manage and automate the day-to-day workflow in a more efficient way.

In some embodiments, the customer side of the user interface 220 can include users, such as external users, customers and/or clients. Customers can access the portal 200 through a client side landing page. Customers can be, for example, corporate clients/customers. Once an external user is invited to use the portal, they will be able to provide some log in details. The log in details can include a user selected password, so that the customer can have some access rights to lock into the system. Once the customer has the appropriate log in information, the customer can log on to different portions of the portal, as shown in the output portion 250, the customer can see project plans, solutions account lists, customer agreements, and progress reports. In this way, if a customer would like to access a particular document, they can download the document from the portal, instead of the bank having to provide a physical copy.

Process Layer

The process layer 230 can include, in some embodiments, a project management process 201, a workflow management process 202, a work scheduler process 203, an alert messages notifications 204, a document management process 205, an automated implementation template process 206, an online search process 207 and a MI report process 208. Based on the information input by the users and steps defined within the templates, the system process the data according to the pre-defined business rules to generate, for example, project plans. A simulation tool can allow the users to, for example, tailor the project plans to suit the needs of different clients and/or customers. Confirmed project plans can then trigger various workflow and tasks which in turn can update the work schedulers of different stakeholders for the tasks to be performed. In some embodiments, reminders of tasks will also be automated within the system through alerts.

Project Management

The project management process 201 can be used to manage a project. The details of the project management process will be discussed in more detail with respect to FIG. 3.

Workflow Management

In some embodiments, the workflow management process 202 can be used to manage the workflow of a management team. For example, after the sales manager wins a particular mandate from an external client, the sales managers can provide a request to the implementation team to assign implementations resources. Through the workflow management process 202 each person in each office in each country can follow the same workflow process which streamlines the procedure worldwide.

Work Scheduler

The work scheduler process 203 is another function within the portal that the implementation, integration and service teams can use to manage their day to day work. In some embodiments, the work scheduler can help busy managers to remember dates, timelines, and different milestone deadlines they have to meet different clients' requirements. The work scheduler process 203, for example, can notify managers of important dates and help to automate manager's day to day lives.

Alert Messages Notifications

The alert message notifications process 204 is an email process that can notify a manager of a deadline or a notice with in the portal. For example, if another person on a team wants to remind the managers of a task, that person can make use of the alert messages notifications process 204 to send that manager an email notification. In some embodiments, if a team member wants to remind the sales manager to do a sales handover within a particular period of time, the team member can use the alert message notification process 204. The system itself can trigger an email notification alert to remind the sales manager.

Document Management

The document manager process 205 can manage a repository and database of documents. These documents can include legal documents signed by a customer. For example, during a cash management mandate, the bank may have to ask an external customer to sign different legal documents. After the documents are executed, they need to be stored in a single repository for future retrieval. The document management process 205 is a mechanism or a function within a system for a manager, after they receive the signed documents from the customer, to scan the document into the system. Then, the scanned image of the signed legal document is stored in the system for future retrieval and also to provide a single database of all the signed documents for clients.

Automated Implementation Templates

The automated implementation template process 206 works with the document management process 205 to create the documents that are stored in the document management process 205. For example, the automated implementation template process can create documents and can format internal templates. In some embodiments, this process can provide all users with standardized templates to be used throughout the system and company. The automated implementation templates will be discussed in more detail with respect to FIG. 3.

Online Search

The online search process 207 can permit searching of the information stored in the database layer 240. The online search process 207 can allow the system to extract data to assist the management or persons perform their analyses.

MI Reports

The MI reports process 208, (management information report process) can work with the online search process 207 to extract relevant data from the databases 240 and then according to a pre-defined parameter and pre-defined rules, the MI reports process can prepare reports for management use. For example, a performance report is one kind of MI report. A performance report can be used to compare the performances of different managers.

Database Layer

The database layer 240 can include a centralized client database 241, a project workflow management database 242, a centralized documentation database 243, and a business parameters database 244.

Client Database

The client database 241 can include, for example, information about clients, including company information, client contact details, solution details, account lists, and estimated business vale (EBV) spreadsheets.

EBV Spreadsheets

EBV represents the dollar value of a mandate or of a particular customer. In some embodiments, this is dollar value that the company can earn from a particular customer. The EBV for a customer can be recorded in an EBV spreadsheet. The information can be stored in a systematic manner for future retrieval and also for report analysis. The creation and management of EBV spreadsheets will be discussed in more detail with respect to FIG. 3.

Solution Details

The solution details can include the solutions matrix, which is a suite of products or services that are subscribed by the customer in a country within a deal. In some embodiments, it can form the basis on which various tools and project documents are derived. Solution details can include product information, including products, such as internet banking, payment products, and a receivable product. All of these products can be in the solution detail. Solution details will be discussed in more detail with respect to FIG. 3.

Project Workflow Management Database

The project workflow management database 242 includes project plans, workflow templates and implementation templates.

Project Plans

Through project plans, clients can trace the progress of a deal by tracking their project task against a plan and viewing the project by country and/or phase. For example, the project plan is incorporated into the system so that when a manager wants to evaluate the status of a particular timeline or milestone of a particular project, the manager can use the project plan tool. As discussed in more detail below with respect to FIG. 3, the project plan function is available in the project room. The project plan can define the schedule of the project for project team members and clients to follow. The system also can use the project plan to trigger notifications to corresponding users, in order to streamline the project as a whole.

Workflow/Implementation Templates

Workflow and implementation templates are templates that are stored in the system for managers to access to create workflow and implementation documents.

Documentation Database

The portal can support imaging, archiving, uploading, downloading and email attachment. In some embodiments, the documentation database 243 includes documents such as product agreements, negotiations, implementation documents, and a document repository.

Product Agreements

The documentation database 243 can include all product agreements between the bank and its customers. Therefore, if a project manager wants to find an agreement on a later date, that project manager can access all agreements available in the database.

Negotiation Database

In some embodiments, the negotiation database can aid the negotiation process by tracking the terms and conditions negotiated between the company (e.g., bank) and its clients and/or customers. The negotiation database can store all of the negotiation information for a particular client and or a particular agreement. For example, the negotiation database can store draft negotiation documents, documents related to the flow of the negotiation and the final result of the negotiation. In some embodiments, the negotiation documents can be kept in one place so that they are easy to retrieve for future purposes.

Implementation Docs

The implementation documents can be templates that are used to assist managers to standardize their workflow. An example of a template is a progress report. After visiting with a customer, a progress report can be prepared to inform the customer of a project status. In some embodiments, the progress reports are prepared in a standard format. Therefore, when every manager accesses the portal, they can retrieve the progress report template as one of the implementation documents. The manager can add in the client specific information to forward the final report to the client. Implementation documents are discussed in more detail with respect to FIG. 3.

Document Repository

The document repository can store all the documents located within the portal. The document repository can include, for example, post-implementation surveys, which are documents created by a manager after each project to get feedback from a customer. They are stored future use and also for our feedback purposes.

Business Parameters Database

The business parameters database 244 can include product/country matrices and business rules associates with the various clients and customers.

Product/Country Matrix

The project and the country matrix is a matrix of the current products and countries served by the company. For example, there could be 18 countries in the list. If a country for example, South Africa, is not in the matrix, South Africa can be included by adjusting the system parameters and including it within the country matrix. Also, if a new product is introduced, it can be included in the matrix by adjusting system parameters.

Business Rules

The business rules can be stored in the business parameters database. For example, after the sales manager wins a deal, the deal is handed over to an implementation manager within a set period of time.

Output

Both the company and clients/customers can view and download reports from the portal. The reports can include progress reports 258, management reports 253, internal status reports 252, project plans 251, 256, documentation 254, customer agreements 257, solutions account lists 256 and post implementation surveys (not shown in FIG. 2). All of these can either be viewed on-line or downloaded as soft or physical copies. The various outputs will be discussed in more detail with respect to FIG. 3.

Automation Methodology

Figure 3:
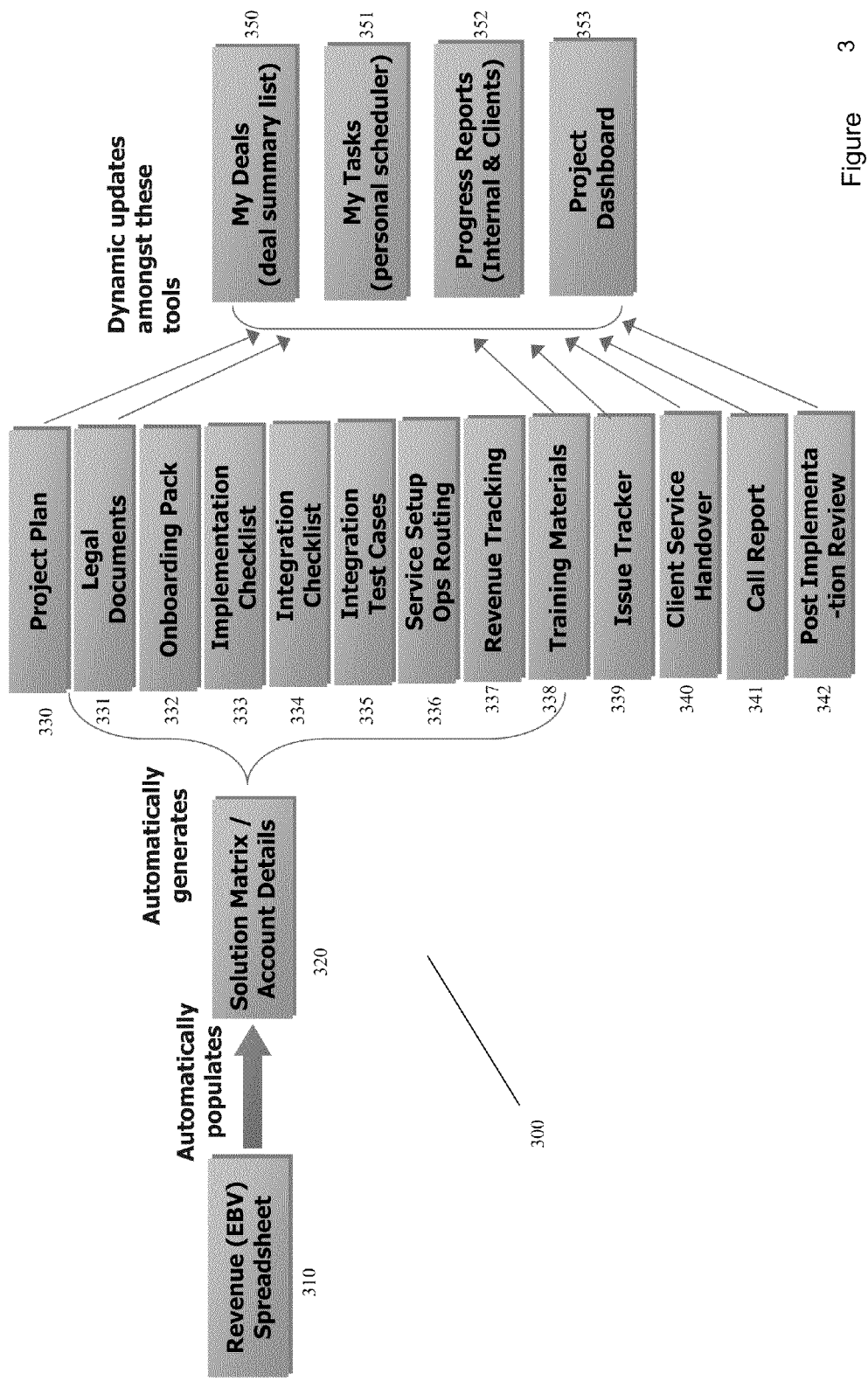
FIG. 3 is a diagram of automation methodology of the web-based implementation portal, according to embodiments of the present disclosure.

FIG. 3 is a diagram of automation methodology 300 of the web-based implementation portal, according to embodiments of the present disclosure. In some embodiments, the automation methodology can streamline processes by automatically creating and updating documents and programs within the portal. The revenue (EBV) spreadsheet 310 can automatically populate the solution matrix/account details 320 (discussed in more detail below). Solution matrix/account details 320 automatically generates one or more of the following programs: a project plan 330, legal documents 331, onboarding pack 332, implementation checklist 333, integration checklist 334, integration test cases 335, services setup ops routing 336, revenue tracking 337, training manuals 338, issue tracker 339, client service handover 340, call report 341 and post implementation review 342, all to be discussed in more detail below. Each of these programs 330-342, then dynamically updates the following tools: my deals 350 (a deal summary list), my tasks 351 (a personal scheduler), progress reports (internal and client) 352, and a project dashboard 353. Each of these tools is discussed in more detail below.

Revenue (EBV) Spreadsheet

Figure 4:
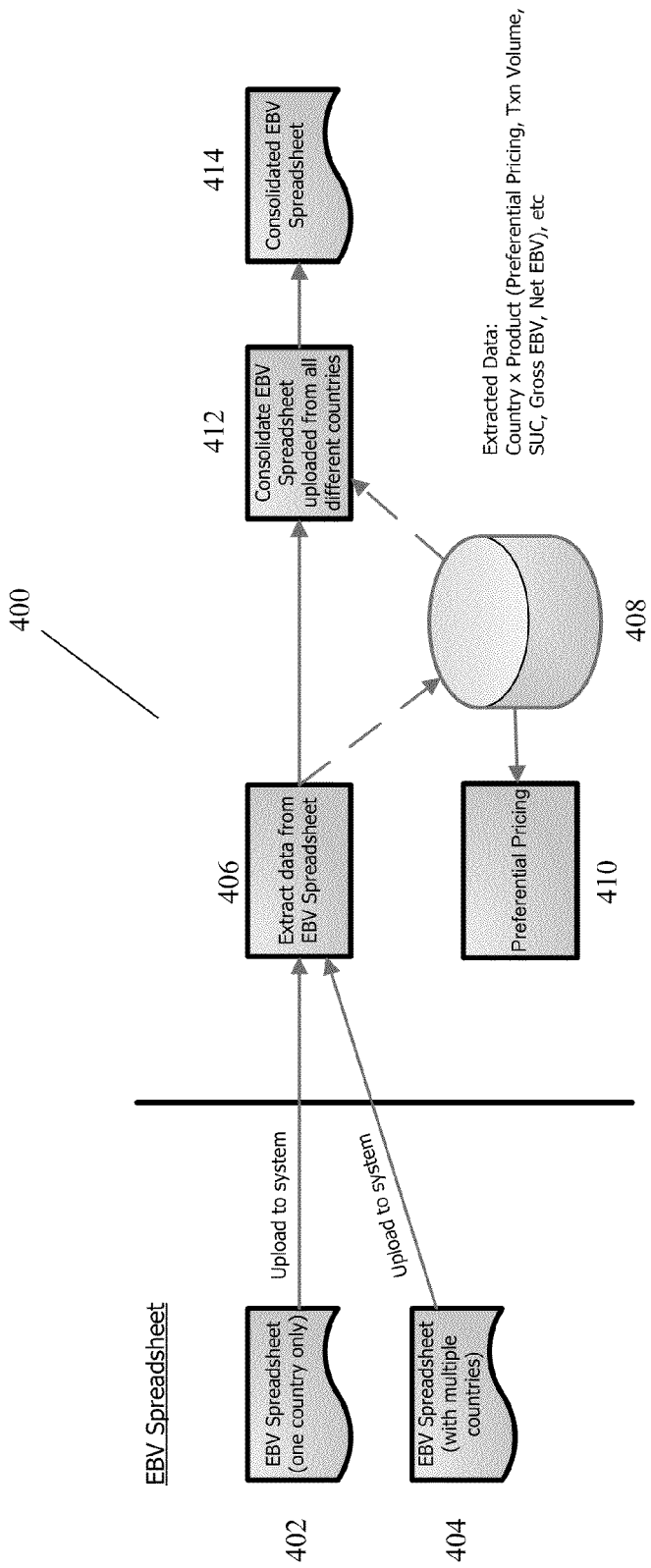
FIG. 4 is a diagram of an EBV spreadsheet of the web-based implementation portal, according to embodiments of the present disclosure.

FIG. 4 depicts how an estimated business value ("EBV") spreadsheet 400 is created in the web-based implementation portal, according to embodiments of the present disclosure. FIG. 4 shows the design concept of the EBV spreadsheet information extraction logic, which is used to populate a solution matrix in the portal. FIG. 4 shows that, in some embodiments, both a single country EBV spreadsheet 402 and a multiple country EBV spreadsheet 404 can be uploaded to the portal. Then, the data in both EBV spreadsheets 402, 404 are extracted to 406. Upon uploading, the system extracts the details from the uploaded spreadsheets 402, 404, e.g., country x product settings, transaction volume, standard unit cost, gross estimated business value, net estimated business value, etc. This information can serve as the basis for generation of various tools (e.g., solutions matrix, project plan, legal document list etc.). The system also will, based on the information from the EBV spreadsheet, determine the necessary procedures and workflows (e.g., EBV endorsement, EBV Validation etc.). In some embodiments, the information can be stored in a database 408, which is in communication with a preferential pricing module 410. The extracted data and data from the database 408 are then consolidated at consolidation module 412 to create a consolidated EBV spreadsheet 414.

In some embodiments, the EBV spreadsheet is used to record the revenue from the customer. For example, in a particular mandate, the size of the revenue that can be earned from that particular customer can be recorded for internal usage. To start with, the sales manager, or whoever opens the deal, can upload the revenue, or the EBV spreadsheet of the deal, into the portal. In the EBV spreadsheet, the products, account details, including account information, the types products the customer likes, the country information, for example, which country the customer would want the solution to be in, pricing information, and how much to charge the customer, can be stored.

All of this core information can then be extracted from the spreadsheet and used in the automation procedure. Therefore, once the salespeople upload and input this revenue spreadsheet into the system, the system can automatically populate a solution matrix of account details, for that particular customer and deal. Therefore, after the sales manager uploads the EBV spreadsheet, the implementation manager or anyone else on the team does not need to input the product and the country and the pricing again. This data will be automatically transferred into the system.

However, if the implementation manager can obtain further information from the client or modify the stored information, the implementation manager can amend or modify the EBV spreadsheet.

In some embodiments, to streamline the above process, the portal is designed to serve as a centralized place to organize the EBV spreadsheet and various EBV related activities in a project. The functions can be divided into four sections:

(1) EBV Spreadsheet

This section is to provide a repository of EBV spreadsheets uploaded from different countries. The portal allows user to upload two types of EBV spreadsheets: (i) new EBV, and (ii) retain EBV. The new EBV spreadsheets of individual countries can be consolidated. The system allows project team members or other authorized users (e.g., product manager and relationship manager) to download the complete EBV of a project as a whole. Version control is applied to both types so that user can trace the revision history of EBV spreadsheets. The system can extract the net EBV and gross EBV and present in an EBV summary. The user also can specify the country assumptions on subscribed products or services.

(2) Pricing Information

This module includes preferential pricing information. When a user uploads the EBV spreadsheet, the system can scan and compare the standard tariff and customized tariff of the products involved to check for preferential pricing. The items pertaining to preferential pricing can be listed in this module.

(3) EBV Endorsement

In some embodiments, a sales manager may be required to prepare an EBV spreadsheet for a sales team head and or for a sales head's endorsement. Based on the EBV and the organization structure of the sales team, the system retrieves the default reviewer(s) and adds to the reviewer list. If necessary, the user can override the default settings by adding/removing reviewers. Reviewers can download the consolidated EBV spreadsheet for review. An EBV summary also can be provided for reference. After reviewing, the user records the endorsement results. If necessary, the user can trigger the system to notify a sales head for further endorsement. The system can automatically send a notification to regional sales head as a reference.

(4) EBV Validation

After a sales handover meeting, the implementation manager, client implementation team head or other reviewers can validate the EBV spreadsheet. Based on the EBV, the system would determine the default reviewer and add to the reviewer's list. If necessary, the user can customize by selecting a different reviewer. The system allows reviewers to download the consolidated EBV Spreadsheet for validation in this section. After reviewing, the users can record the validation results. If necessary, the user can trigger the system to send request for further review.

Figure 5:
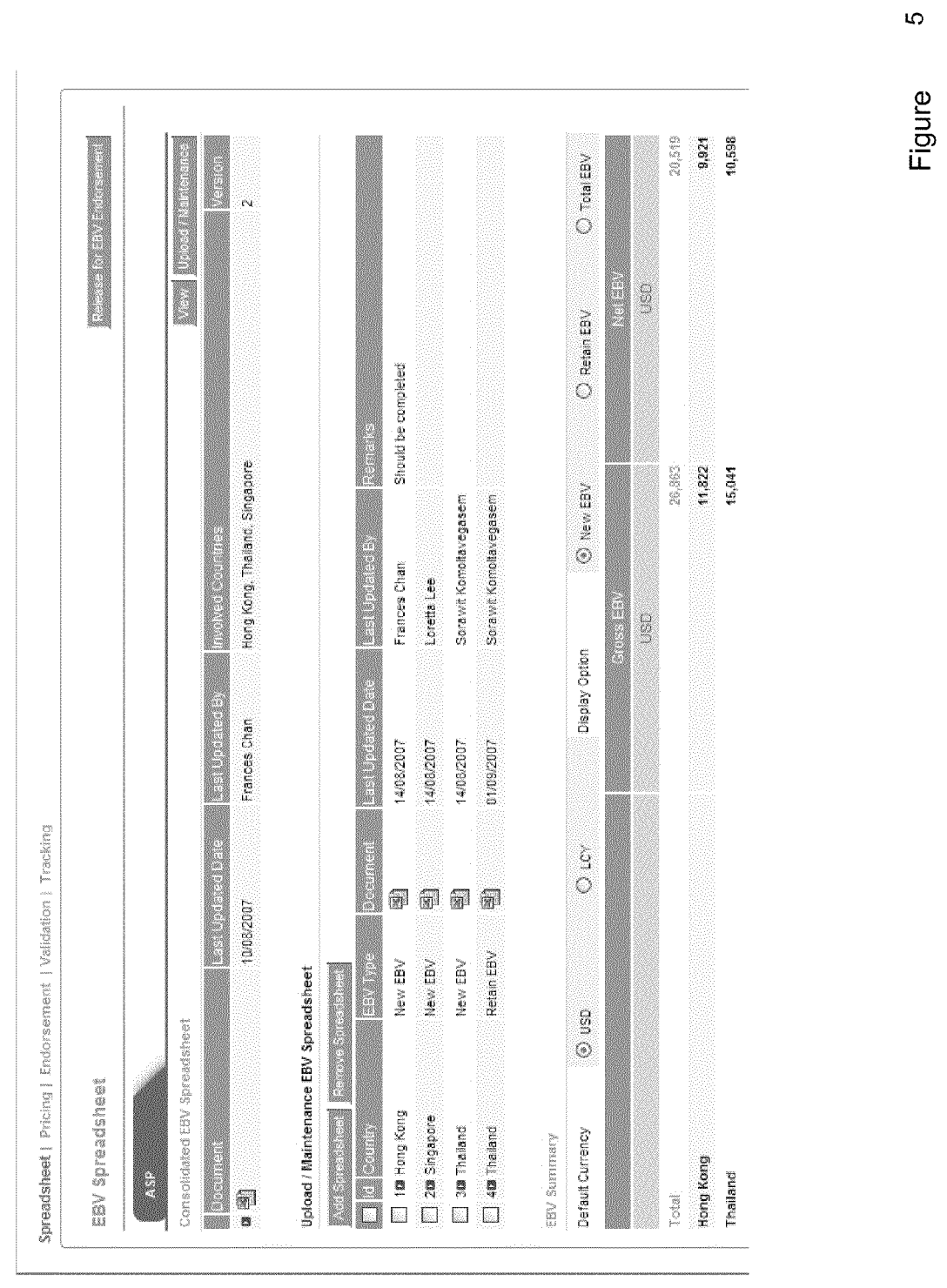

FIG. 5 is a screenshot of an EBV spreadsheet of the web-based implementation portal, according to embodiments of the present disclosure. In some embodiments, the EBV spreadsheet can include a country assumption feature, which are products or services captured from the EBV spreadsheet that are grouped by product categories. Products subscribed in one country are displayed in one single page. The user can input the assumptions for each product category or input the overall assumption/remarks for a country. The EBV spreadsheet also can include an EBV Summary, which displays the total Gross EBV and Net EBV uploaded and their breakdowns for individual countries. The figures can be viewed in local currency (e.g., HKD) or USD. A user also can view the values in New EBV or Retain EBV separately.

Solution Matrix/Account Details

Figure 6:
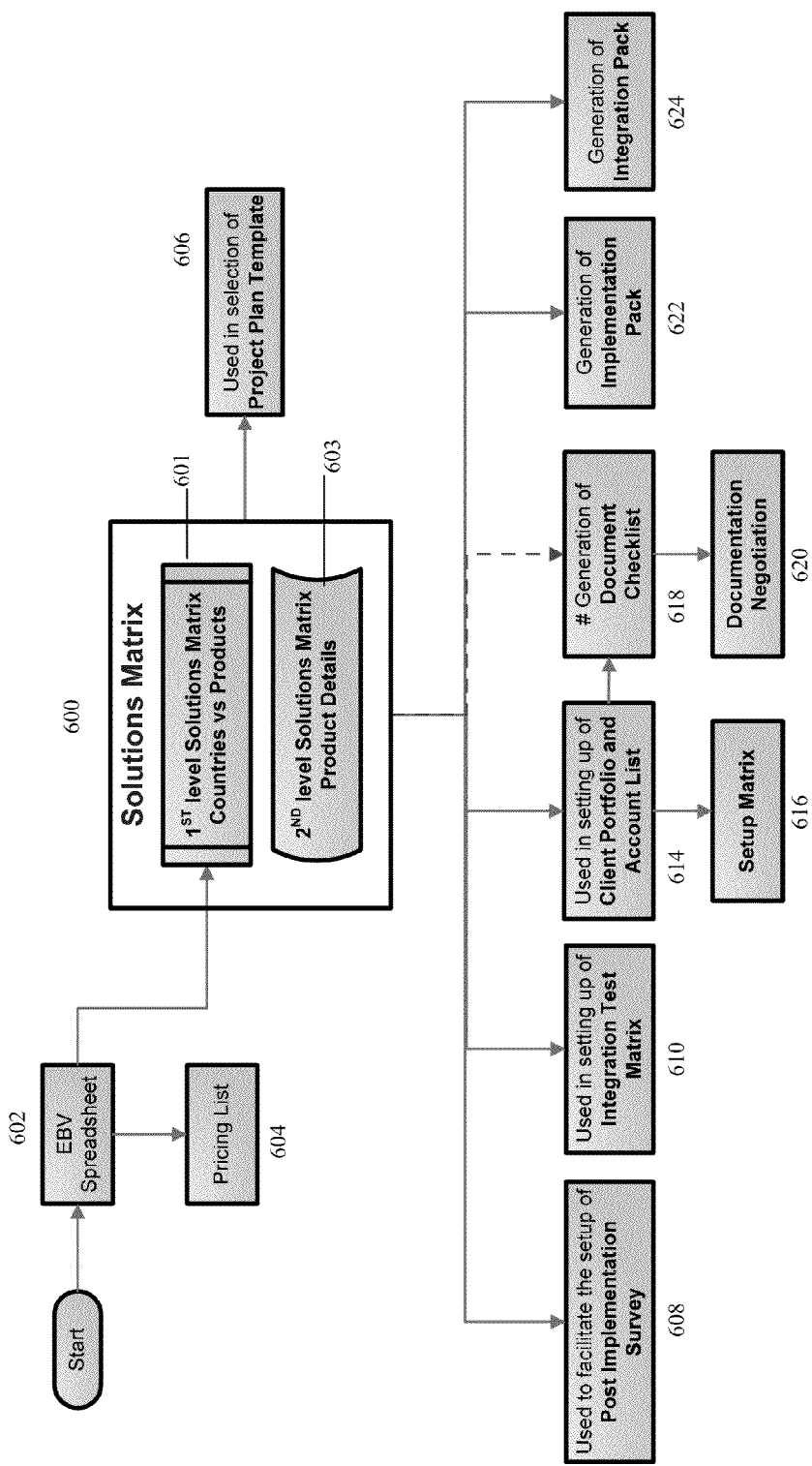
FIG. 6 is a diagram of a solutions matrix of the web-based implementation portal, according to embodiments of the present disclosure.

Data from the EBV spreadsheet can be used to populate the solution matrix and the account details. FIG. 6 is a diagram of a solutions matrix of the web-based implementation portal, according to embodiments of the present disclosure. The solutions matrix is a suite of products or services that are subscribed by the customer in a deal. It forms the basis on which various tools and project documents are derived. This function serves as a centralized place to provide an ongoing and holistic view of the suite of products that are to be implemented or already in place for a customer. As shown in FIG. 6, the solutions matrix 600 is generated using the EBV spreadsheet 602 and the pricing list 604. The solutions matrix 600 can be used, for example, to generate a project plan template 606, facilitate setup of a post implementation survey 608, set up an integration test matrix 610, set up a client portfolio and account list 614 for a setup matrix 616, generate document checklists for document negotiation, generate an implementation pack 622, and generating an integration pack 624.

In some embodiments, the solutions matrix is designed for a user to view and maintain the solutions of a project (i.e. products or services subscribed in each country within a deal). It is presented in 2 levels: (i) $1^{st}$ Level 601—country and product matrix and (ii) $2^{nd}$ Level 603—product details in each country. The first level of the solutions matrix provides an overview of what products are being subscribed in a two dimension table (country x product category). Examples of product categories are "account services", "collection services" and "payment services." The first level shows which specific product(s) under a project category would be implemented for each country (or down to city level for particular countries). The $2^{nd}$ Level 603 of solutions matrix is the details of products subscribed for a country. The product specific information for each product is grouped under corresponding product categories.

In some embodiments, in order to reduce the human effort in setting up the solutions matrix from scratch, the solutions matrix can be designed to extract the country x product settings from the EBV spreadsheet. The user can use the facility provided to extract details from latest EBV spreadsheet to the solutions matrix.

Based on the best knowledge from the EBV spreadsheet, the system can generate the country x product settings in the first level of the solutions matrix. The system also may automatically fill in some product details in the second level of the solutions matrix derived from the EBV spreadsheet.

After the solutions matrix is generated, the appropriate manager can amend the country x product settings in first level of solutions matrix or adjust the product details in the second level. When the user has finished inputting the solutions matrix and determines that it is ready to release, he/she may confirm the solutions matrix. After confirmation of the solutions matrix, the user can trigger the system to populate the settings of solutions matrix to various packs and checklists in corresponding functions. The system can retrieve the necessary implementation tools and product-specific documents according to the country x product settings to the implementation documents/integration documents. If the solutions matrix is revised subsequently, the user populates the changes from solutions matrix to the pack or checklist.

In some embodiments, the country x product setting serves as the basis when doing setup in various project tools, e.g., project plan, integration test matrix and post implementation survey. In these tools, the system can provide the setup framework according to the country x product settings in the most recently confirmed solutions matrix. For example, when the user is generating a project plan, the system can allow the user to select a suitable project plan template. In some embodiments, one of the template options is to generate the project plan according to the country x product settings in solutions matrix. The system can retrieve suitable project plan tasks from the project plan template according to the most recently confirmed solutions matrix. In another example, the setup or integration test matrix also can be based on the most recently confirmed solutions matrix.

Figure 7:
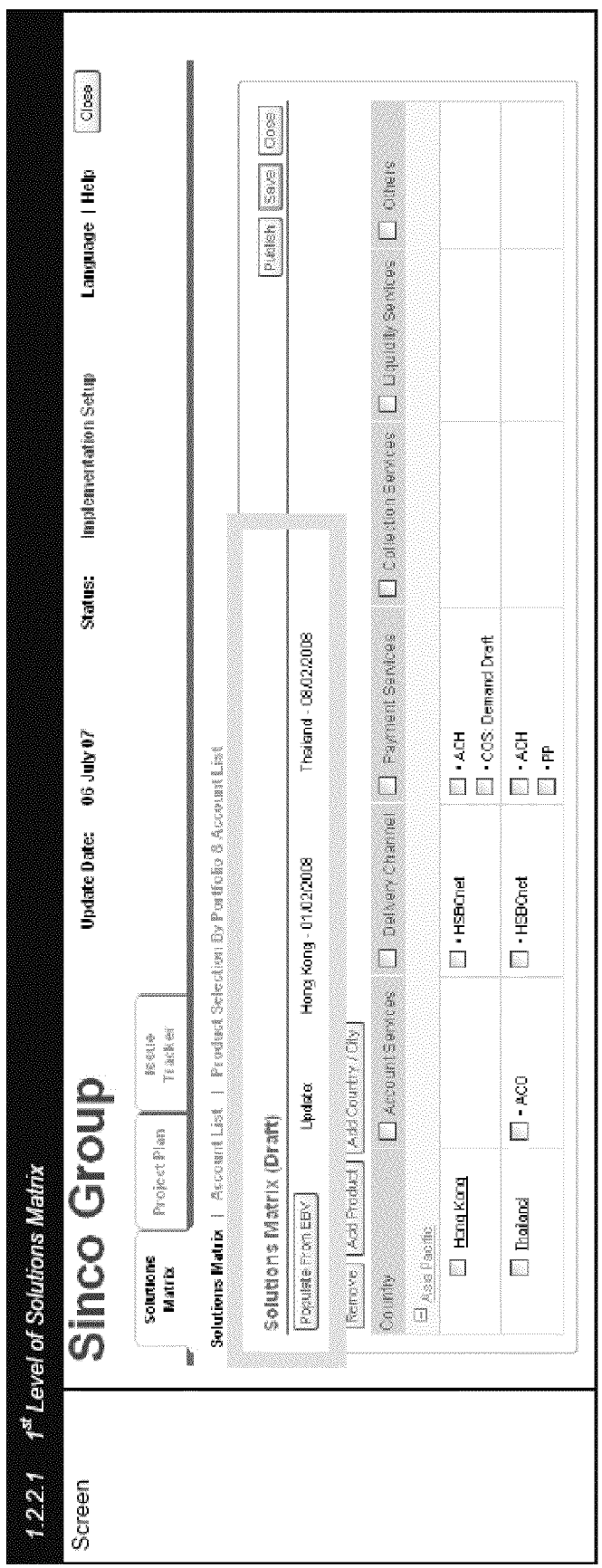
FIG. 7 is a screenshot of a solution matrix of the web-based implementation portal, according to embodiments of the present disclosure.

FIG. 7 is a screenshot of a first level solutions matrix of the web-based implementation portal, according to embodiments of the present disclosure.

Project Plan

Figure 8:
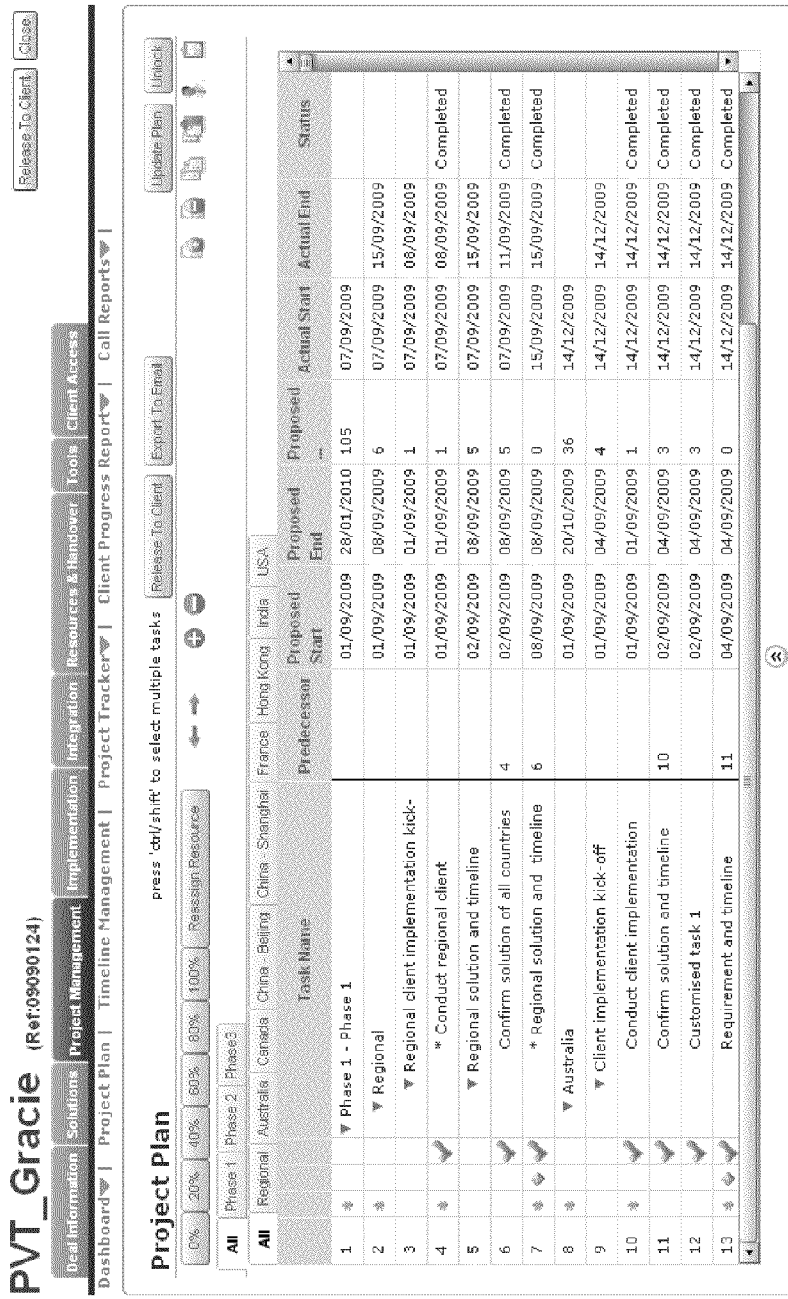
FIG. 8 is a screenshot of a project plan function of the web-based implementation portal, according to embodiments of the present disclosure.

A project plan is designed to facilitate generation and maintenance of a project. The project can define the schedule of the project for project team members and clients to follow. The system also can use the project plan to trigger notifications to corresponding users, and streamline the project as a whole. FIG. 8 is a screenshot of a project plan function of the web-based implementation portal, according to embodiments of the present disclosure.

In some embodiments, before generation of a project plan in the project room, a user can define the following in system:
(1) Country-product selection in the solutions matrix; and
(2) Project schedule and implementation approach in a "Timeline Management" function in a solutions matrix or in current project plan function.

When the information is ready, the user can trigger the system to generate a project plan. The system can extract project plan tasks from the templates stored in system and construct the project plan accordingly. The project plan template can include a number of task blocks (e.g., "local implementation preparation" block, "service launch and post implementation" block, "service setup" block, etc.). The sequence of task blocks, task duration and default dependencies can be defined in a template. After project plan generation, the solutions matrix may be updated in some situations (e.g., adding/removing products).

Legal Documents

As discussed above, the portal can create legal documents for the deal or project and can store those legal documents in a convenient place that the internal team and external team can access.

Figure 9:
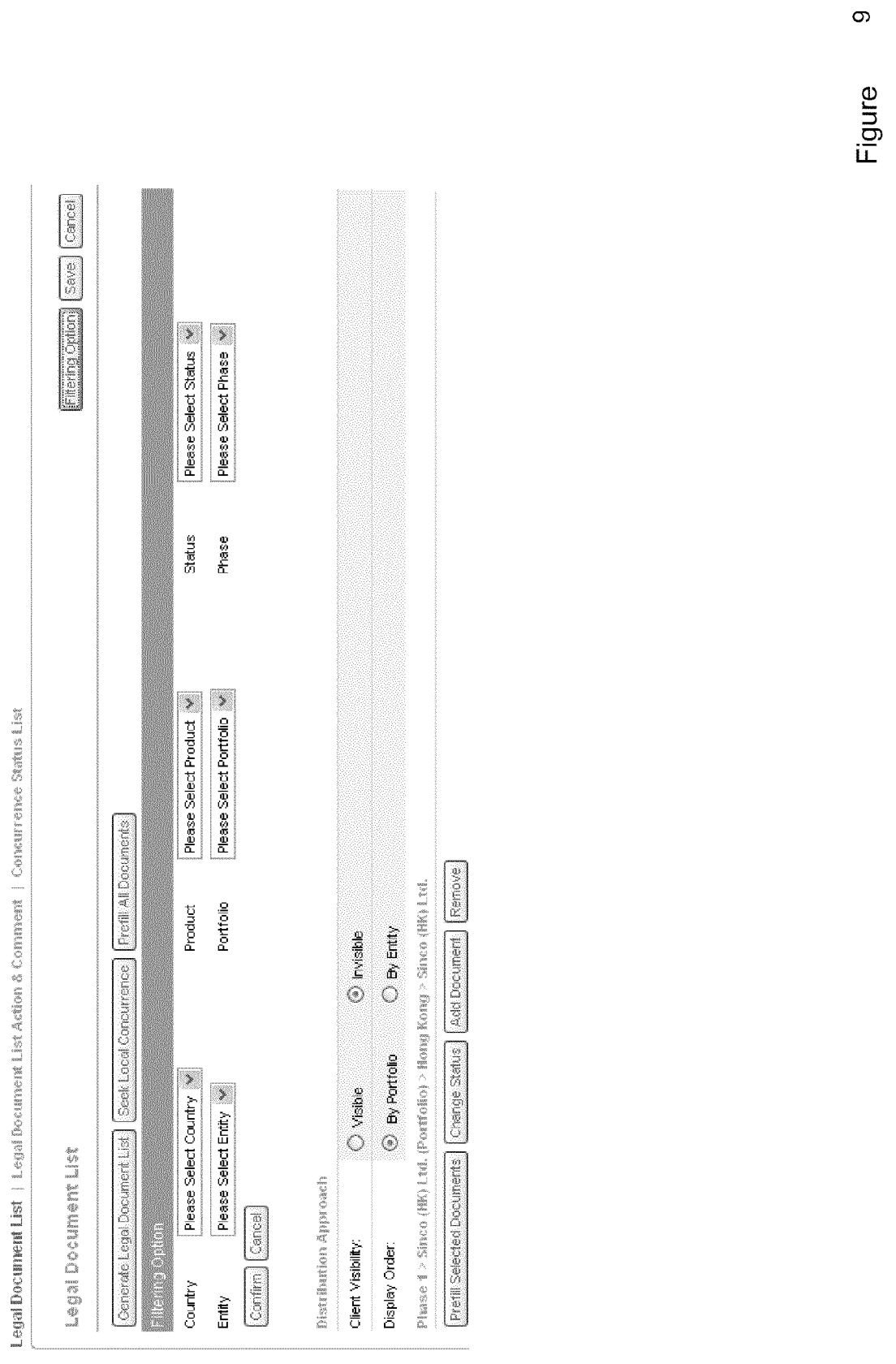

FIG. 9 is a screenshot of a legal document list of the web-based implementation portal, according to embodiments of the present disclosure The portal can have a legal document list that includes a list of the legal documents that are used in a deal. The legal documents in the checklist can originate from the following sources:

(1) System generated—Based on the products or services subscribed in the confirmed solutions matrix, the corresponding product details and account list, after user has triggered the generate document checklist feature, system can extract a set of legal documents from the document library. The extracted documents can be organized and presented in the document checklist according to the entities and account settings defined in "accounts & services schedule;"

(2) Prepared and uploaded by user—User can also prepare a custom document in local PC and then upload to the checklist;

(3) Add from current Project Room;

(4) Add from a Resource Library; and (5) Add from previously registered cross reference documents for the same entity/within the Customer Group.

In some embodiments, the document library can contain a full list of legal documents available in the system and system can use pre-defined extraction logic to extract legal documents from the document library to the document checklist. The system can use the following information from the confirmed solutions matrix to retrieve legal documents from the template for each product:

(1) Applicable to the region or local country;

(2) Applicable to the product;

(3) Product details defined in the template (if any) must match with the product details in Solutions Matrix, and (4) Specific conditions (if any) are fulfilled.

The user then can generate the legal document list. If only country x product information is available in the confirmed solutions matrix, the system can display documents grouped by country x product. Under each country and product, the legal documents are sorted by document name by alphabetical order (ascending order). After the user has filled in more information for example accounts, portfolio, the user can generate the document checklist again to reflect the latest changes in this screen.

Onboarding Pack

The on-boarding pack 332 is a pack which contains a set of implementation documents and an implementation checklist to facilitate the client implementation team and/or client integration team to manage the client onboarding process. The on-boarding pack provides the system users (internal/external) with the hardware and software requirements to help them to access the portal functionalities in an efficient manner.

Implementation Documents and Checklist

The implementation document and checklist 333 functions can facilitate the end-to-end process for manager to manage project documents. In some embodiments, the checklist can be used to do the following:
(1) To generate documents (i.e., implementation documents and integration documents) based on project details (e.g., product settings in solutions matrix);
(2) To generate checklists for internal use (i.e., implementation checklist and integration checklist) and for client reference (i.e., client checklist);
(3) To facilitate the organization of documents into different custom-defined groups, and to allow the user to define the client access rights to the document groups;
(4) To facilitate the on-going maintenance of documents. For example, users are allowed to download the documents to a local PC for viewing and modifications, and to upload revised documents back to system;
(5) To apply version control on the documents, so as to keep track of the revision history;
(6) To provide a central repository for sharing, storage and retrieval of documents among project team members; and
(7) To facilitate users in releasing or exporting the documents to clients.

In some embodiments, the manager can prepare documents and checklists for internal use or for customers' reference. These materials are organized into two sections, namely (1) documents and (2) checklists. The system generates implementation documents and integration documents (if needed) based on the project details and product settings in solutions matrix. The system can generate the implementation checklist, integration checklist (if needed) and client implementation checklist based on the project details and product settings in solutions matrix. Each country within a deal can have a set of checklists. For each country within a deal, the system can retrieve a set of check items based on the product/services subscribed in the country. Firstly, the system can retrieve the items from the checklist template at regional level. Secondly, the system can retrieve items from the checklist template at local level in a similar way. All these retrieved items can be gathered and included in the checklist for the country.

Integration Checklist

The integration checklist 334 is designed to facilitate the integration manager to manage the integration for a project. This checklist facilitates the user input of integration related details and manages integration in the deal and to facilitate the user to manage the integration testing process. In some embodiments, the system can base the integration solution associated to the country/product to generate the necessary integration related project plan tasks into the project plan's relevant country/phase.

Integration Test Cases

Figure 10:
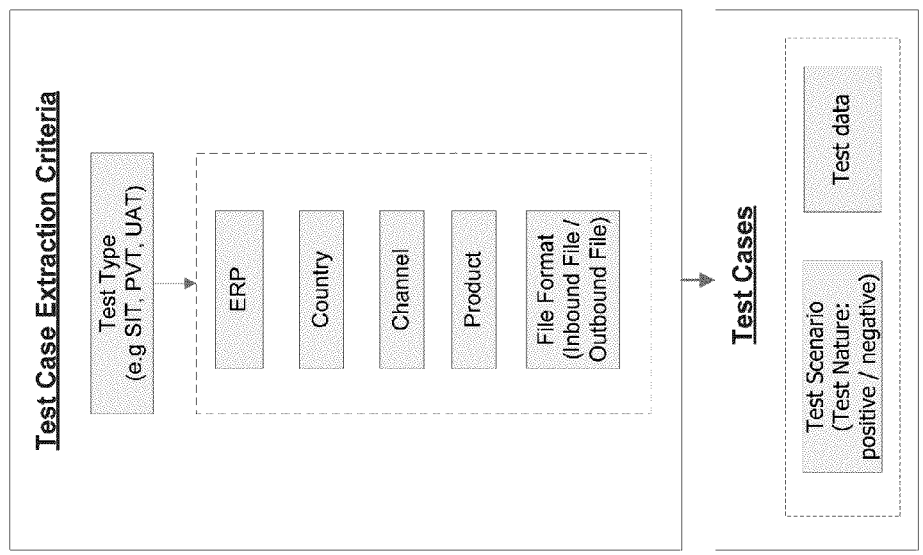
FIG. 10 is a diagram of a test case extraction criteria of the web-based implementation portal, according to embodiments of the present disclosure.

When the user defines a test profile, the system can use pre-defined logic to extract integration test cases 335. FIG. 10 illustrates how the system extracts test cases. After the user has selected the test type, the system would based on the selected test type and the information from the deal (i.e., enterprise resource planning (e.g., a system that manages the various properties within a company), country, channel, product, inbound file) to search for the relevant test cases. When system has completed the searching, system would display all the test cases under the corresponding test scenario or test data.

Call Report

Figure 11:
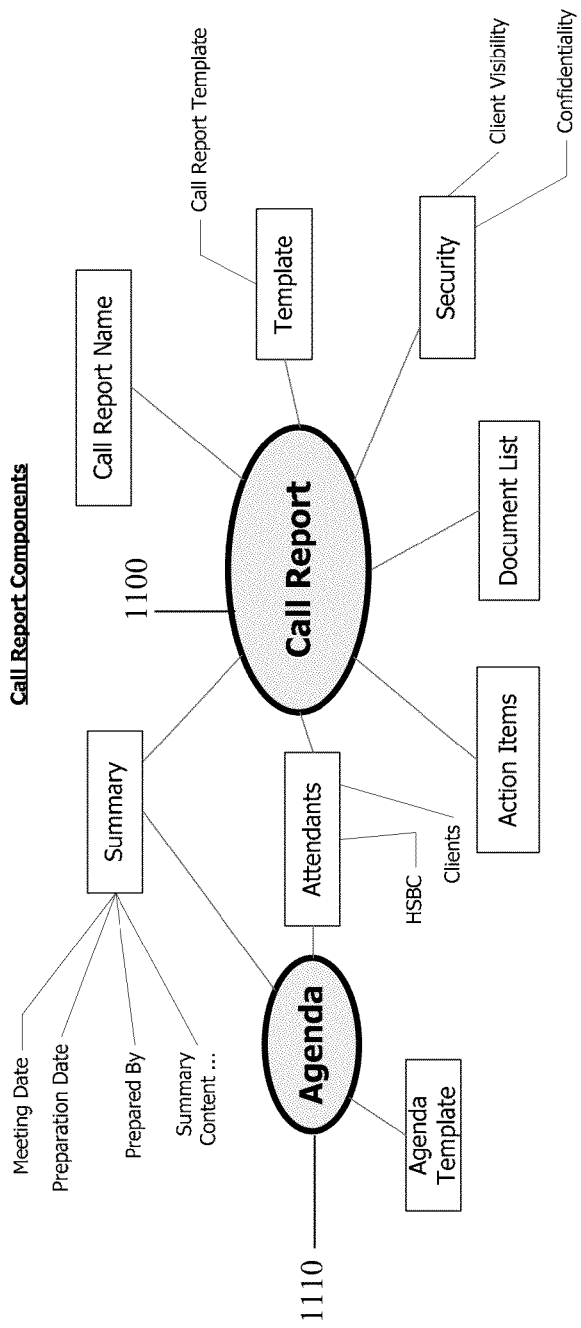
FIG. 11 is a diagram of a call report module of the web-based implementation portal, according to embodiments of the present disclosure.

The automation methodology also can generate a call report 341. FIG. 11 is a diagram of a call report module of the web-based implementation portal, according to embodiments of the present disclosure. The agenda and call report function is a tool to assist user in preparing agenda 1110 and call reports 1100 for meetings or calls. The system provides this function for the user to prepare the agenda 1110 before the meetings and serves as a common space for user to prepare and review the call reports 1100 within the system after the meeting. The design concept of the function is to facilitate the user in preparing the agenda 1110 and call report 1100 either based on pre-defined templates or without templates. When preparing the call report 1100, the system allows the user to import the information from the previously prepared agenda 1110 to the call report 1100 for further updates. In the call report, the user can add documents, add follow-up action items, mark client visibility and set confidentially to the call report. All the action items created from the call report will appear on 'My Tasks' and 'Progress Report' automatically. As shown in FIG. 11, the call report can include, for example, a summary with the meeting date; preparation date; who prepared the report; a summary of the content; the call report name; a security level; a document list; action items and the attendees, both internal and external.

In some embodiments, the agenda templates can be stored in the system and the user can select an appropriate one to follow. The user can input the action items identified during the meeting, such that other users can keep track with the progress of the items. When the action owners have carried out the tasks and updated the status in his/her "My Tasks," the status of action items will be updated and reflected in a call report screen.

Service Setup OPS Routing

Figure 12:
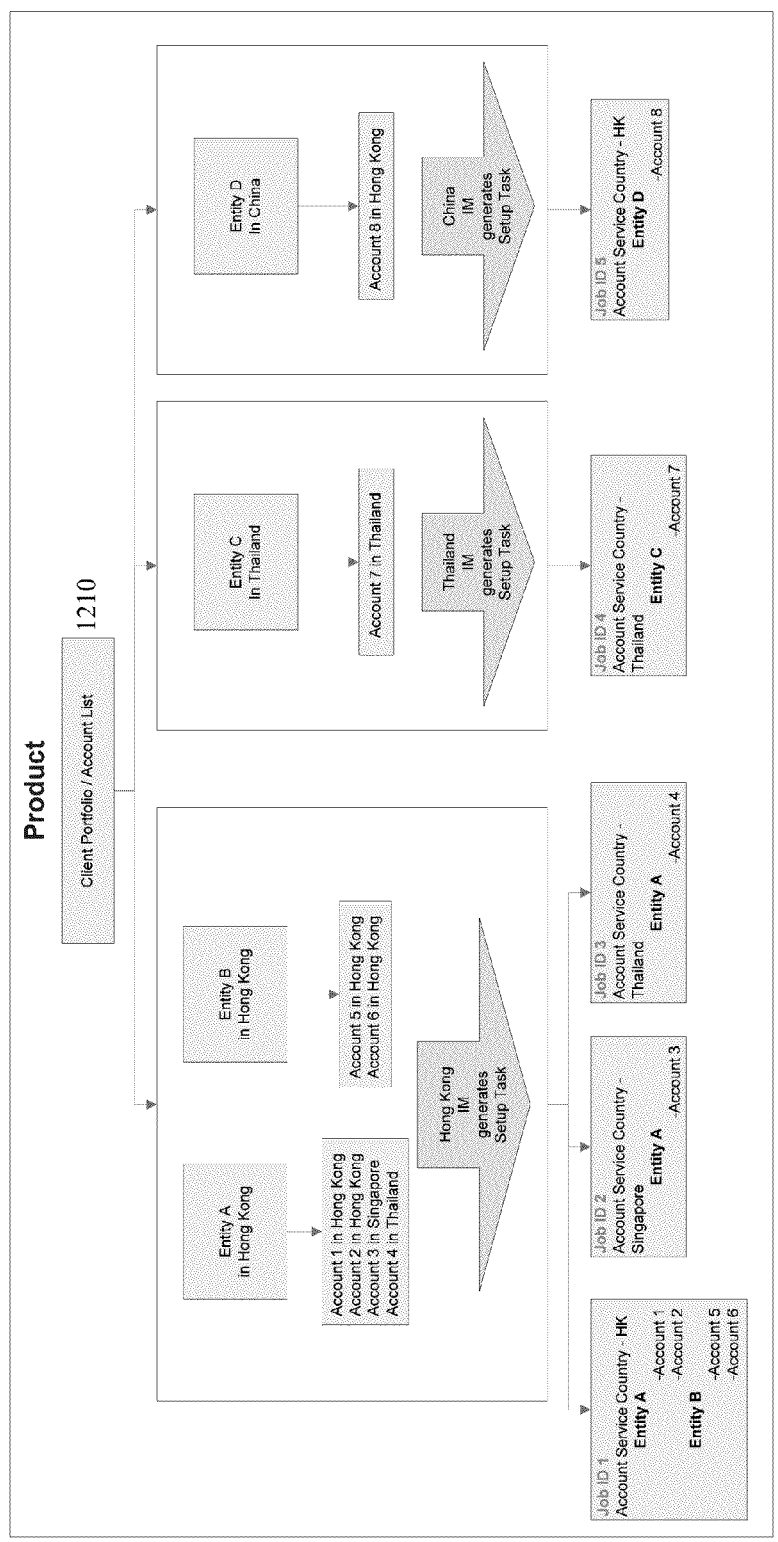
FIG. 12 is a diagram of a service setup matrix of the web-based implementation portal, according to embodiments of the present disclosure.

The service setup OPS routing 336 function is designed to facilitate users to manage the service setup. For service setup, a setup task would be generated based on account service country and product. The system would assign a job ID for each setup task. A setup task contains the required materials and information for processing department to setup a service. FIG. 12 is a diagram which explains how the system generates a setup task (or job) based on information including client account, entity, product, countries involved in the deal. For the client portfolio/account list 1210, the system can extract the information and the relationship of the product, the account service countries, the entities and the entities domicile countries from the client portfolio/account list within the project. The entity refers to the legal entity for which the services would be setup. In the FIG. 12, there are four entities (Entity A, B, C, D) domiciled in three different countries (Hong Kong, Thailand and China). Each entity contains a list of accounts locating in different countries (Hong Kong, Thailand, Singapore). For example, entity A (domicile in Hong Kong) has account 1 and 2 in Hong Kong, account 3 in Singapore and account 4 in Thailand. Entity B (domicile in Hong Kong) has accounts 5 and 6 in Hong Kong. Entity C (domicile in Thailand) has account 7 in Thailand and Entity D (domicile in China) has Account 8 in Hong Kong.

In some embodiments, to generate setup tasks, the system can use the following logics: (1) for the same product, all accounts located in the same country would be grouped into a single task; and (2) when the implementation manager generates setup tasks in the setup matrix, the system can generate the setup tasks for those entities domiciled in the country(ies) in which the setup coordination task(s) is/are handled by the implementation manager. The implementation manager can be the person at the company who is responsible to manage the delivery of the solutions to customers or clients. Under this logic, for example and referring to FIG. 12:

The manager in Hong Kong would be able to generate the following three setup tasks:
  (1) Job ID 1—This task contains Entity A and Entity B domicile in Hong Kong and accounts in Hong Kong;
  (2) Job ID 2—This task contains Entity A domiciles in Hong Kong and an account in Singapore; and
  (3) Job ID 3—This task contains Entity A domiciles in Hong Kong and the account in Thailand.

The manager in Thailand would be able to generate the following setup task:
  (1) Job ID 4—This task contains Entity C domiciles in Thailand and an account in Thailand.

The manager in China would be able to generate the following setup task:
  (1) Job ID 5—This task contains Entity D domiciles China and an account in Hong Kong.

In the task detail of a setup task, the system would extract and display the relevant legal documents for each entity in the task from the document checklist.

Revenue Tracking

Revenue tracking provides a method in the system to track whether the expected revenue actually turns into actual revenue. At the beginning, only a revenue estimate is provided, but through revenue tracking module, data can be input to the system to update that estimate. In the pre-mandate stage, a sales manager can use the products and services subscribed to estimate the project annual net profit and prepare the EBV spreadsheet. After the implementation is started, the implementation manager can do EBV tracking to compare the actual revenue against the estimated revenue marked in the EBV spreadsheet.

Training Materials

Training function is a comprehensive tool for a user to prepare for client training and facilitates the recording of follow up actions after training. The objectives of this function are as follows: (1) to record the training details and pass to trainer for training preparation; (2) to generate training agenda; and (3) to generate training materials (e.g. training guide) and provide a central repository of training materials among trainers and implementation managers.

Figure 13:
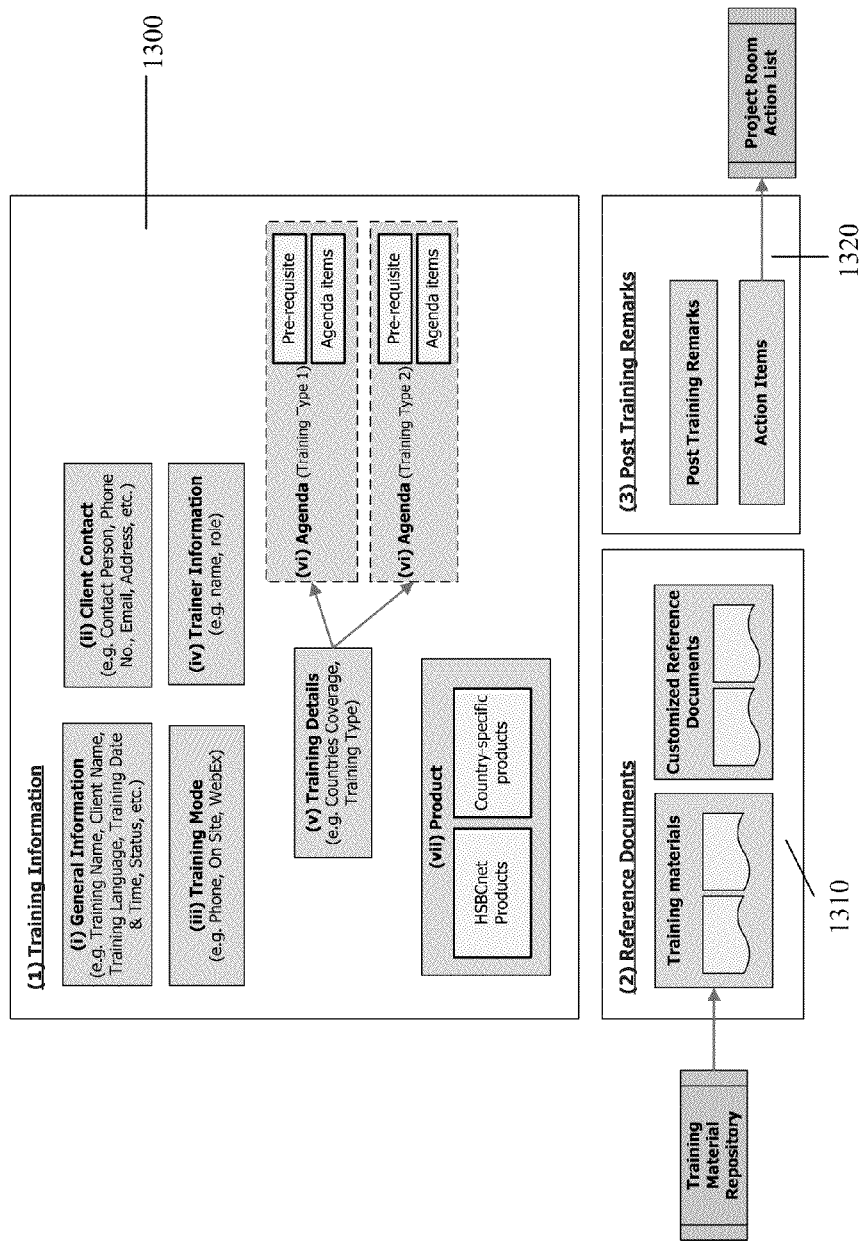
FIG. 13 is a diagram of a training module of the web-based implementation portal, according to embodiments of the present disclosure.

FIG. 13 is a diagram of a training function of the web-based implementation portal, according to embodiments of the present disclosure. The training materials include training information 1300, reference documents 1310 and post training remarks 1320. The training information 1300 can include, for example, general information, for example, training names, client names, training languages, dates, time and status; client contact, for example, contact person, phone number, email and address; training mode, for example, phone, on site, WebEx; training information, for example name, role; training details, for example countries coverage, training type, and agendas; and product information. The reference documents 1310 include training materials and customized reference documents. The post training remarks 1320 can include remarks and action items. For example, the system will provide a function for a user to collect training feedbacks and follow-up actions after training. For training related to deals, the new action items also will be reflected in "My Task" (My Tasks) and "Project Room Actions Items" (Project Tracker).

Issue Tracker

Issue Tracker 339 is a project management tool. The issue tracker 339 can be used to manage or track an issue for the client and/or customer.

Client Service Handover

After the implementation manager finishes an implementation, the implementation manager will send the customer to another team called a client service team who is acting as the on-going relationship manager for the customer. This is called a client service handover. The client service handover function is designed to be a shared workplace for the implementation manager and client services team to carry out the client service handover and maintain the ongoing service support details of the deal. The objectives of this function are as follows: (1) to provide the functionalities for users (e.g., implementation manager and client services manager) (2) to record the deal support details; (3) to act as a centralized place for project team members to refer to the deal support details; (4) to facilitate the client service handover request and review mechanism; and (5) to provide overview of client service handover status.

Post Implementation Review

Figure 14:
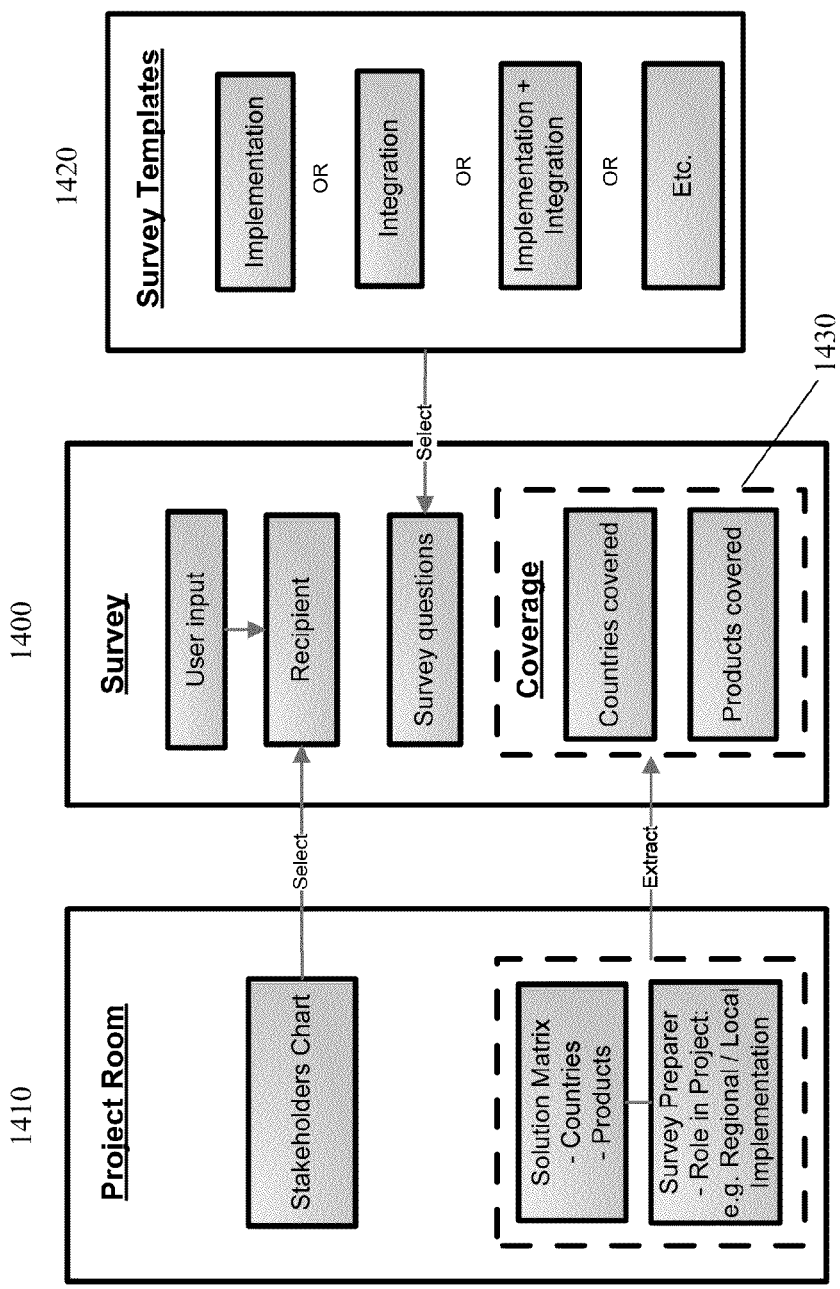
FIG. 14 is a diagram of the post implementation review module of the web-based implementation portal, according to embodiments of the present disclosure.

After an implementation is completed, the user can prepare a post implementation survey to collect a client's feedback. This function can be used to facilitate the user in preparing the survey and testimonial at the post implementation stage. FIG. 14 depicts how a user can generate a survey through the system. In some embodiments, to generate a survey, the user can create a survey record 1400 which includes the recipient, survey questions and the scope i.e., the countries and products covered in the survey. The recipient can be selected from the stakeholders chart within a project room 1410 and there can be one recipient for one survey. The user can select an appropriate template for the survey from the list of survey templates 420, but cannot modify the questions in the template. The survey templates are pre-defined in the system and each template contains a set of survey questions.

Then, the user defines the coverage 1430 for each survey. The system uses the role of user in the project to retrieve countries and products from the solution matrix and the user then confirms the coverage for the survey. For example, a user takes up the role as a local implementation manager in a project, when he/she prepares a survey for a local deal or a local country in a regional deal, the system can retrieve the country handled by the user and products under the country (local product name) from solution matrix for the user to select and confirm. The product name can be shown in local product name. When a regional manager prepares a survey for a regional client, system can extract all the countries and products for the project from the solution matrix for the manager to confirm. The product name can be shown in the regional product name.

In some embodiments, after the user has confirmed the generation of the survey record, the system will, based on the selected template, generate a survey in a document format. The user then downloads the survey and sends it to client by email or in hardcopy format for filling in the survey. After the survey is completed, the system allows the user to upload the scanned survey to the survey record.

My Deals/My Tasks

Members in a team usually have to manage several projects in the system. The "My Deals" function provides a holistic view of a list of the responsible projects with their basic information, for example, deal name, managers, total new estimated business value (EBV), project health status and progress. These key details of deals can be shown under this function, and can be synchronized in real time with the details within the project room of each deal. All project team members who are system users would be able to view and monitor his/her projects in the "My Implementation" function.

In some embodiments, the "My Deals" functions include providing (1) filtering options, (2) access to the project room; and (3) quick links to different functions in the project room. Each is discussed below:

(1) Provide Filtering Option

As projects complete and new projects start, the list of projects may accumulate and become inconvenient for managing. The my deals screen provides searching functionalities to help users in looking for particular projects or generate a view better to understand. The user can make use of the filtering function to look for desired projects.

(2) Access to Project Room

From this function, user can access the corresponding project room to view the project information and perform various activities.

(3) Provide Quick Links to Different Functions in Project Room

Allows users to directly access the desired function in project room, system provides the following quick links: project dashboard; project tracker; project update; site map; solutions matrix; project plan; stakeholder chart; legal agreement list; service set up; and testing matrix.

In some embodiments, "My Deals" also can include "My Tasks." The My Tasks" function serves the following purposes: (1) act as a personal to-do list and a task organizer to facilitate users in managing tasks in the system; (2) categorize the tasks into different sections according to their status, so that user can have a holistic view of the number of tasks on hand; (3) allow supervisors to monitor subordinates' task list; and (4) act as a medium where system delivers the tasks to the task owners according to the project plan, call report and project tracker.

In some embodiments, a task may be related to deals in the system and are triggered according to the project plans. The tasks also may come from other sources, e.g., user assigns task to his/her subordinates, call reports and project tracker. The system provides the facility for the user to create tasks for own use or on behalf of other users. By making use of this function, the user can plan their working schedule and activities.

Tasks shown under the "My Tasks" function are extracted from and synchronized on a real-time basis with various sources within the project room of all projects managed by a user. These sources are from the task list section of the following modules: project plan, call report, training, project tracker, document checklist, and client service handover. Synchronized information can include the task name, task owner, task description, country, proposed start/end date, actual start/end date, status, percent completion and comments.

Progress Reports

A progress report 352 can be used internally or can be distributed to clients. It is another output during the implementation processes. In different stages the system will be able to extract relevant information to put in a progress report for the manager to manipulate. The manager can then change the progress report based on the manager's own need.

In some embodiments, the system provides different facilities for the user to monitor progress of a project. In a project, the dashboard (including dashboard summary), project plan and progress report are interconnected. The user defines the overall implementation approach, project schedule and detailed task details in the project plan function. When monitoring a project, the user may want to focus on particular summary tasks/tasks and would like to closely monitor their progress. In view of this, the system provides the function for user to select these tasks in the project settings function. In the project settings function, the system presents the standard project plan template according to the deal scope. The project plan contains a list of tasks/summary tasks for the deal's stakeholders to attend. These tasks/summary tasks can be presented in dashboard summary as well as progress report. Thus, the project progress details presented in dashboard summary and progress report are in synchronization.

In some embodiments, the progress report function is a tool for a user to prepare the progress report for a project. The user can prepare a progress report by (1) using system-generated standard report template or (2) manually drafting the report and uploading to the system for record purpose (i.e., customized progress report). If the first method is adopted, the system generates a draft standard report template based on the user-defined progress report details (e.g., reporting period, report content settings) and the information extracted from project plan and project tracker. The user then retrieves the standard report template for further amendments:

In some embodiments, for a local deal, the system retrieves progress information from project plan and project tracker according to the reporting period. One report is generated at pre-defined intervals (e.g., two weeks). The user (e.g., implementation manager) can amend the details before releasing to clients.

In some embodiments, for a regional deal, similarly, the system retrieves progress information from project plan according to the reporting period. The individual report is generated for each country within the deal. In addition, a consolidated report is generated for the regional implementation country.

Project Tracker

Figure 15:
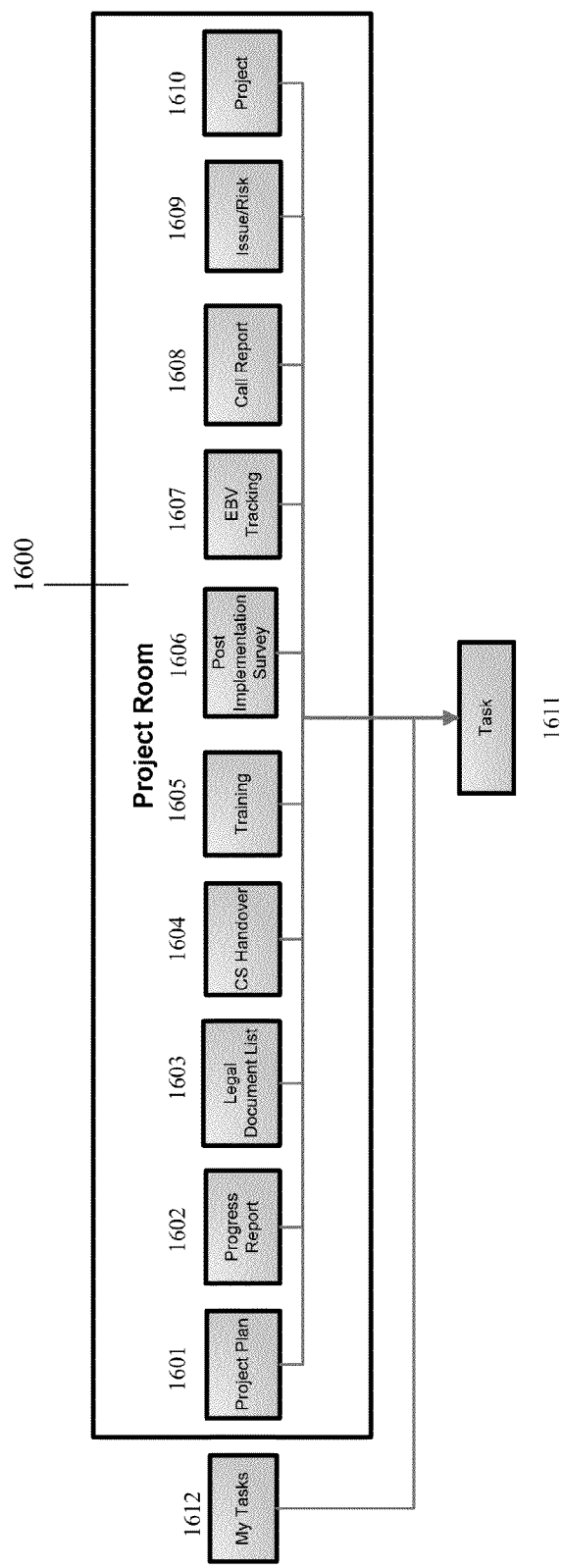
FIG. 15 is a diagram of the task management module of the web-based implementation portal, according to embodiments of the present disclosure.

Project tracker can be used for a user to create, view and monitor issues, risks or actions within a project during implementation. The purpose of creating a task is to assign a task to a user which should be completed within a set period of time. A task can be generated by the system. For example, tasks in the project plan are generated based on the project plan template or by a user. For each task, it contains task details, start date and due date, resources (i.e., assign task owners). In the system, tasks can be created under various modules as shown in FIG. 15. FIG. 15 shows a diagram of a project task management module including project room 1600 having a plurality of modules, including a project plan module 1601, a progress report module 1602, a legal document list module 1603, a handover module 1604, a training module 1605, a post implementation survey module 1606, an EBV tracking module 1607, a call report module 1608, an issue/risk module 1609, and a project module 1610. A task 1611 can be created under each module 1601-1610. Further, in some embodiments, a task can be created from my tasks 1612.

Figure 16:
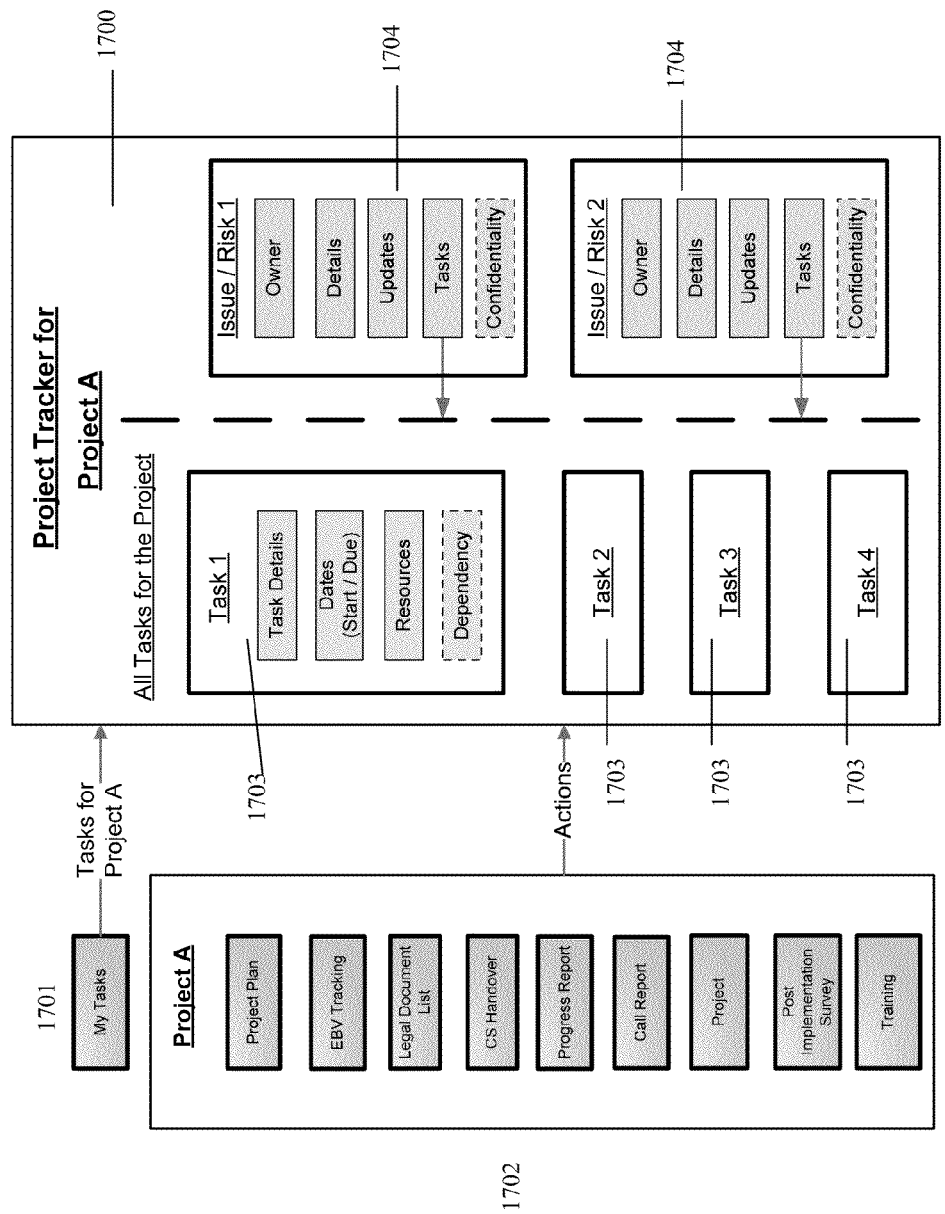
FIG. 16 is a diagram of a project tracker of the web-based implementation portal, according to embodiments of the present disclosure.

FIG. 16 depicts a project tracker 1700. In some embodiments, project tracker is designed for a user to create and manage issues, risks and tasks for a project. It also can be a centralized place to display all the tasks created for the project. For each project, managers can have a project tracker to define issue, risk or task for the project.

A project tracker 1700 for project A is displayed in FIG. 16. My tasks 1701 and the modules in project A, including, for example, project plan, EBV tracking, legal document list, client service handover, progress report, call report, project, post implementation survey, and training modules, are used to create the project tracker 1700. The project tracker 1700 includes the various tasks 1703 and issues 1704 for the project. The tasks 1703 include task details, dates, resources and dependencies. The issues 1704 can include, for example, the owner, details, updates, tasks and confidentiality. The user can create more than one issue or risk within a project. For each issue or risk, there can be multiple tasks. FIG. 17 shows a screen shot of a My Issue/Risk/Task screen within project tracker.

In some embodiments, tasks can be created under various items within the project and also in My Tasks. The project tracker would display all the tasks within the project as a centralized platform. For example, if a task is created for a call report, the system would display the task in the call report, the project tracker and "My Tasks" of the task owner. When the task owner updates the task in "My Tasks," the updates would also be reflected in the call report and the project tracker.

Project Dashboard

Figure 19:
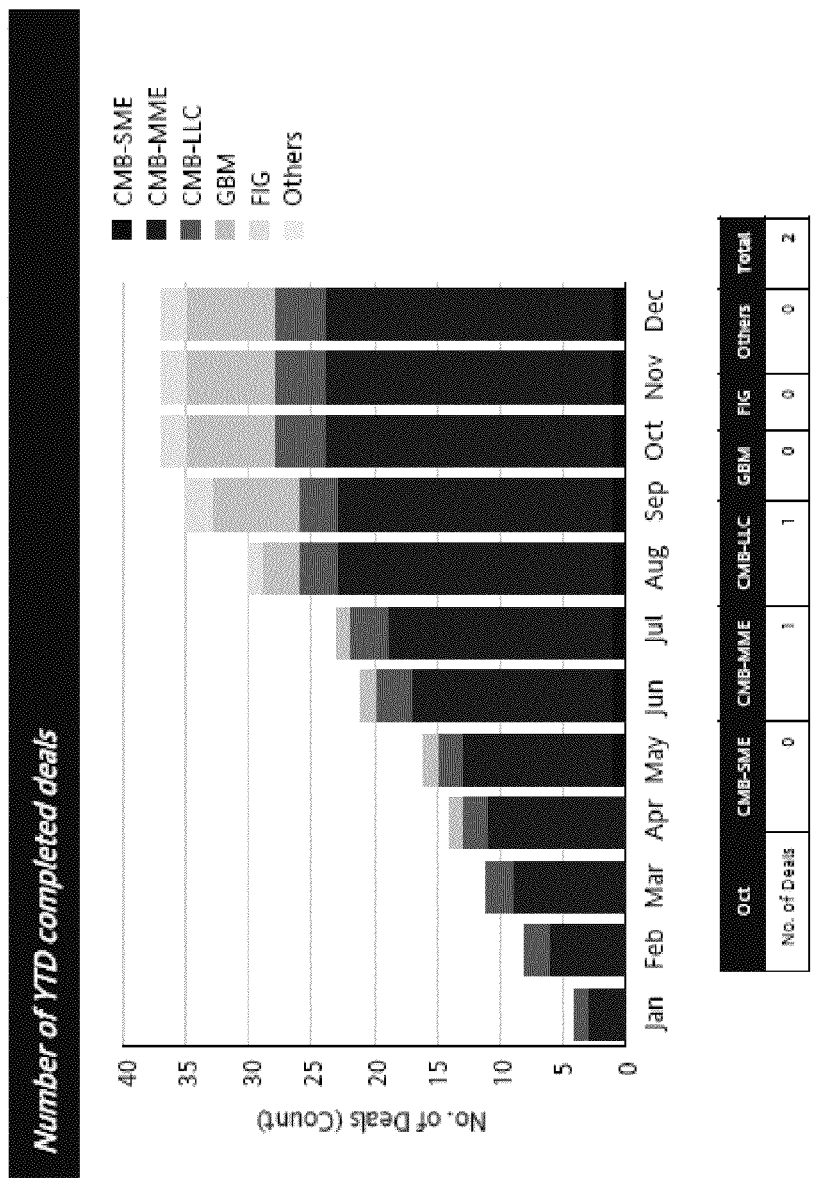
Figure 20:
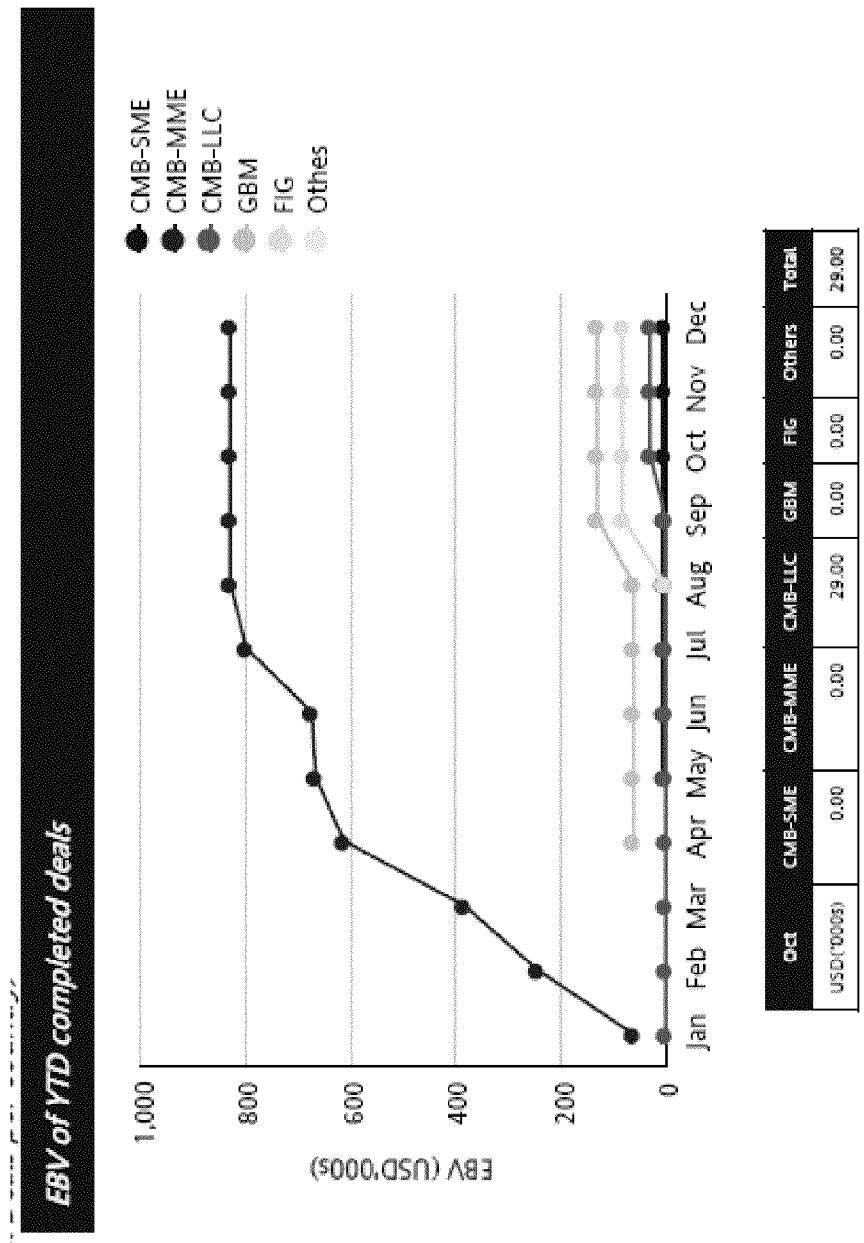
Figure 22:
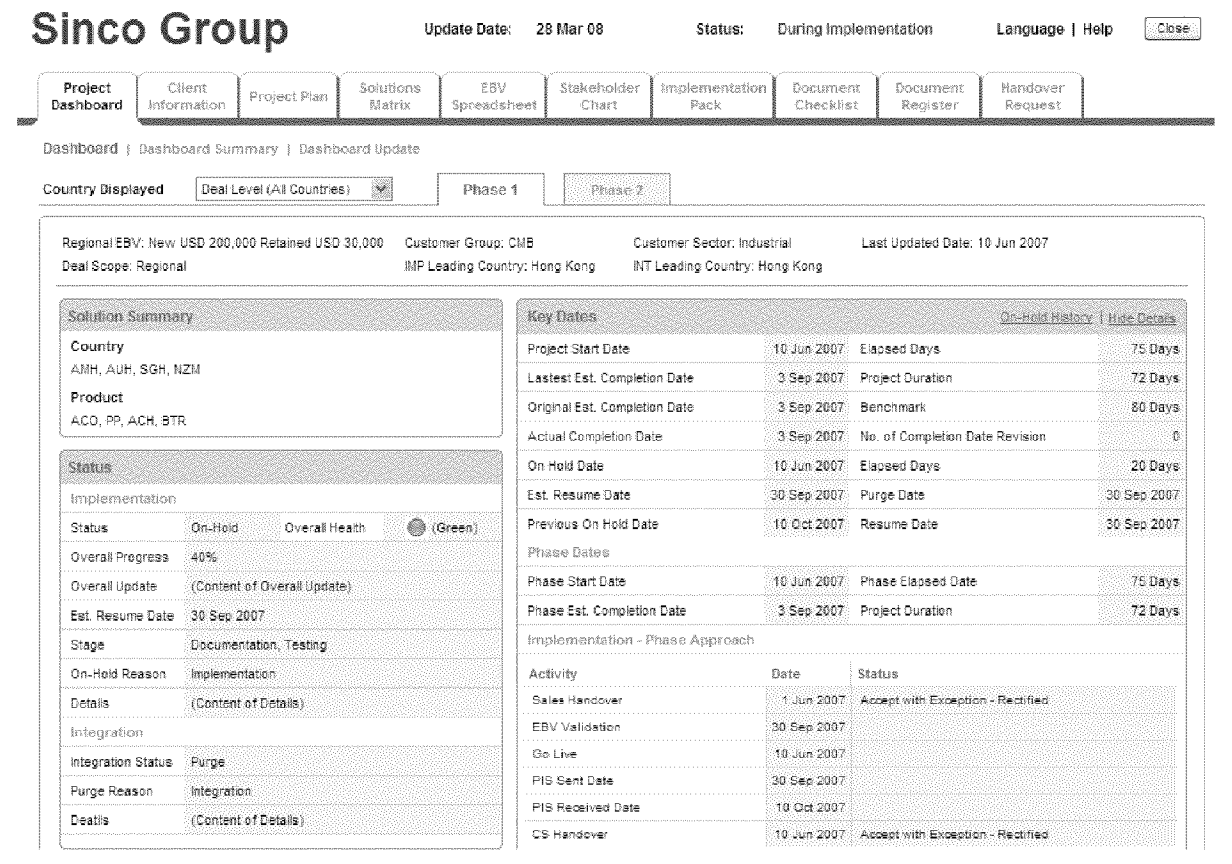

The project dashboard 353 provides the summary view of the deal's key information in the project room. The project dashboard can include three sections: the dashboard, the dashboard summary and the dashboard update. The dashboard is a system that extracts information from different areas in the project room and displays that information for user reference. The dashboard summary is a report to display the status of key tasks in the project (e.g. sales handover, client kick off) which would be updated once a week. FIGS. 18-21 depict a dashboard summary report. FIG. 18 shows a portion of the dashboard management report. FIG. 19 shows a portion of the dashboard management report—the year to date completed deals. FIG. 20 shows a portion of the dashboard management report—the EBV of the year to date completed deals. FIG. 21 shows the completed deals. If there is more than one country in the project, the status can be shown per country. FIG. 22 is a screenshot of a project dashboard function of the web-based implementation portal, according to embodiments of the present disclosure.

Figure 23:
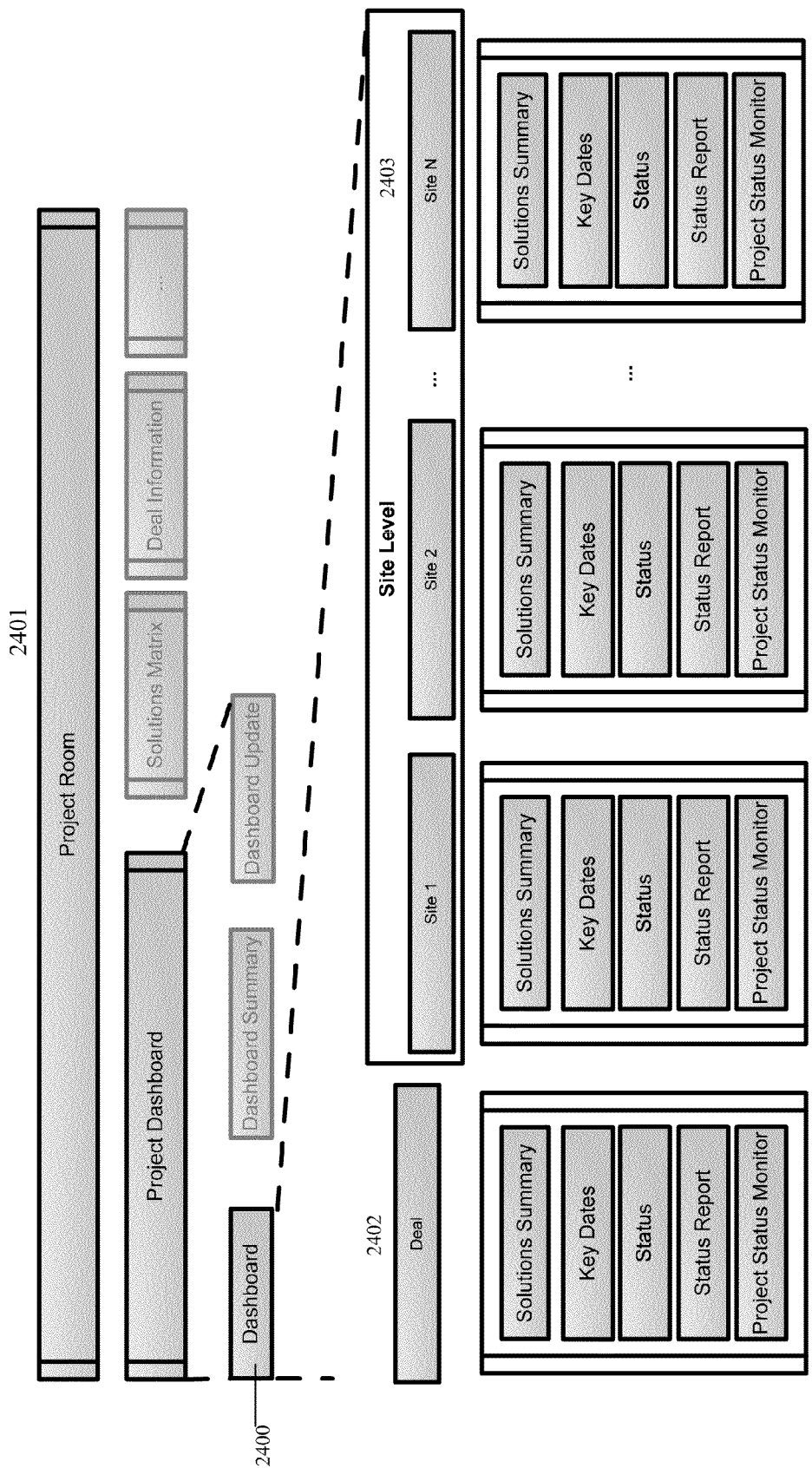
FIG. 23 is a diagram of that illustrates the project dashboard of the web-based implementation portal, according to embodiments of the present disclosure.

In some embodiments, the dashboard provides a summary view of deal's information in the Project Room. FIG. 23 depicts the structure of the project dashboard 2400. The dashboard 2400 is part of the project room 2401. The information in the dashboard 2400 has two levels; a deal level 2402 and a site level 2403. In the deal level 2402, the information applies to the whole deal. The deal level 2403 can include a solutions summary, key dates, status, status reports, and a project status monitor. The site level 2403 refers to the information that applies to a specific site (a site can be a country or a city). The site level 2402 can include a plurality of sites. Each site can include a solutions summary, key dates, status, status reports, and a project status monitor.

Figure 24:
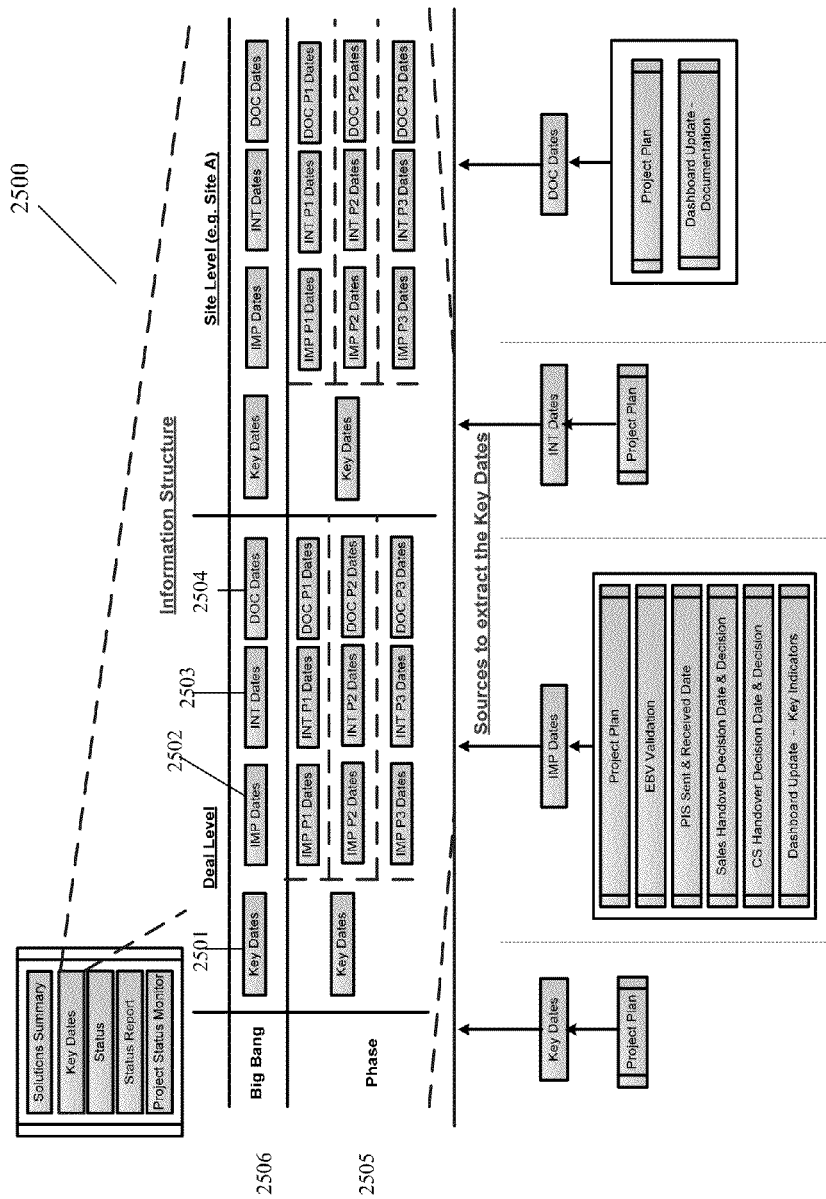
FIG. 24 is a diagram that illustrates the project dashboard (key dates) logic of the web-based implementation portal, according to embodiments of the present disclosure.

FIG. 24 depicts a key dates summary 2500 in the dashboard. The key dates section can include several types of project key dates for example, key dates 2501, implementation related key dates 2502, integration related key dates 2503 and documentation related key dates 2504. The information can be displayed at both the deal level and the site level. If the implementation approach is by phase 2505 instead of big bang 2506, the information would be further defined by phases. In some embodiments, big bang refers to a type of the project implementation approach in which the project is rolled out in one phase instead of splitting it into phases. For example, for "Phase 1—Deal Level," under the implementation related key dates, integration related key dates and documentation related key dates, the system would only include the information under Phase 1 that applies to the deal; "Phase 1—Site Level" includes only the information that applies to the specific site under Phase 1. For key dates, whether the implementation approach is big bang or by phase, the information would be defined by deal level and site level only, i.e. the information under "Phase 1—Deal Level" and "Phase 2—Deal Level" would be the same.

The lower section of the FIG. 24 shows the sources to extract key dates. The key dates extract from the project plan, for example, the project start date and the estimated completion date. The implementation related key dates extract from the project, the EBV validation, the post implementation survey, the sales handover, the client service handover, and the key indicators section in dashboard update, for example, status. The integration related key dates extract from the project plan, for example, integration start date and completion date. The documentation related key dates extract information from the project plan, for example, the documentation preparation date and from the key indicators section in dashboard, for example, the negotiation start date.

In some embodiments, the dashboard can include a project status section. The information in this section can be updated once a week. Thus, any changes in the above sources during the week would not be reflected immediately. The status section is to display the key information regarding the project status and progress which includes status, progress and integration status. The information in this section is defined into deal level and site level.

In some embodiments, the project status can include issues/risks and project milestones. The issue/risk in this section can have a deal level and a site level. At the deal level, the issues/risks apply to the whole deal, while at site level, the issues/risks apply to the specific site only. The milestones (a type of task) in this section can have deal level and site level and grouped by phases if the implementation is by phase. For example, "Phase 1—Deal Level" includes the issues/risks in the Phase 1 for the deal; "Phase 1—Site Level" includes the issues/risks under the specific site in Phase 1. If there is no implementation required for a site in particular phase, then the issues/risks would be unavailable under the phase.

In some embodiments, issues/risks can be extracted from the total number of issues outstanding or overdue, the name of the overdue issues and the total number of risks outstanding from the project tracker. Milestones can be extracted from the milestones completed in the previous week and the milestones to be due in the following week from the project plan. The total number of overdue milestones and the name of the milestones can also be extracted from the project plan.

Status Report

The status report module can be used by the user to prepare the bi-weekly or monthly status report which can be displayed in the dashboard. The system can extract information from the project room to the status report section in the dashboard update every two weeks or every month for users to update the information accordingly. The status report can include the following information: milestone (includes the milestones extracted from the previous status report and the milestones being completed within the report period from project plan); achievement since last update (includes the tasks being completed and the in-progress tasks with new updates within the report period extracted from project plan); and next steps (includes the tasks that are overdue and the tasks that would start or due within the next two weeks or next month right after the report period). The information is extracted from the project plan and the task management.

In some embodiments, the user is able to provide updates in the status report section in the dashboard. There are deal level status reports and site level status reports. A site level status report can be updated by local user which would include the deal status of individual sites.

Depending on the setting for each country, the status report can be a bi-weekly report or monthly report. As the system needs to extract large volume of information for user to prepare the status report, the information would be extracted during weekend for both bi-weekly report and monthly report to avoid a system overload. The extracted information can be displayed in the status report section in the dashboard update for the user to update. The system can allow the user to update the report anytime until the next report generated. The status report can include information on the key milestones that were achieved, the achievement since the last update, and the next steps on that project. In some embodiments, the information can be taken from the project room to display on the status report.

It should be appreciated by those skilled in the art that the present invention also contemplates the use of additional (and alternate) steps and/or items not shown in the figures of the application, and that various steps and/or items in the figures may also be omitted.

In general, it should be appreciated and understood that the specific embodiments of the invention described hereinbefore are merely illustrative of the general principles of the invention. Since numerous modifications and variations will readily occur to those skilled in the art, it is not desired to limit the invention to the exact construction and operation illustrated and described, and accordingly, all suitable modifications and equivalents may be resorted to. Thus, while the foregoing invention has been described in detail by way of illustration and example, numerous modifications, substitutions, and alterations are also contemplated.

What is claimed is:

1. A computer implemented method for automating a customer onboarding process across multiple countries and products using a web based implementation portal, the method comprising:
    receiving, by at least one computer, company information and customer information, said company information including country information for at least one product subscribed to by the customer in at least one country;
    generating, by the at least one computer, a customer revenue spreadsheet based on the customer information and the company information including the country information;
    automatically populating, by the at least one computer, a customer solution matrix based on the customer revenue spreadsheet;
    automatically generating, by the at least one computer, a plurality of programs related to the customer onboarding based on the customer solution matrix; and
    dynamically updating, by the at least one computer, a plurality of tools based on the plurality of programs.

2. The computer implemented method of claim 1, wherein the plurality of programs comprises at least one of a project plan program, a legal document program, an onboarding pack program, an implementation checklist program, a integration checklist program, a integration test case program, a service setup operations workflow program, a revenue tracking program, a training materials program, an issue tracker program, a client service handover program, a call report program, and a post implementation review program.

3. The computer implemented method of claim 1, wherein the plurality of tools comprises at least one of a deal summary list, a personal scheduler, a progress report, and a project dashboard.

4. The computer implemented method of claim 1, wherein the plurality of programs comprises a project plan program, a legal document program, an onboarding pack program, an implementation checklist program, an integration checklist program, an integration test case program, a service setup operations workflow program, a revenue tracking program, a training materials program, an issue tracker program, a client service handover program, a call report program, and a post implementation review program, and wherein said dynamically updating further comprises dynamically updating the plurality of tools comprising a deal summary list, a personal scheduler, a progress report, and a project dashboard.

5. The computer implemented method of claim 1, wherein the customer solution matrix comprises a suite of products or services that are subscribed to by the customer.

6. The computer implemented method of claim 1, further comprising generating, by the at least one computer, a project plan template based on country and product settings in the customer solution matrix.

7. The computer implemented method of claim 1, further comprising performing at least one of the following, by the at least one computer, using the customer solution matrix: generating a client portfolio and account list to populate a service setup operations workflow, generating a document checklist for document negotiation, generating an implementation pack, and generating an integration pack.

8. The computer implemented method of claim 1, further comprising displaying the customer solution matrix, by the at least one computer, in two levels comprising:
    a first level comprising a country and product matrix providing an overview of what products under a project category are subscribed to by the customer for each country; and
    a second level comprising details of the products subscribed to for each country, with product specific information for each product grouped under corresponding product categories.

9. The computer implemented method of claim 1, further comprising modifying, by the at least one computer, responsive to user input, at least one of product settings for a country in the first level of the customer solution matrix and product details in the second level of the customer solution matrix.

10. The computer implemented method of claim 1, further comprising retrieving, by the at least one computer, implementation tools and product-specific documents according to the product settings for a given country to one or more implementation documents or integration documents.

11. The computer implemented method of claim 1, further comprising automatically modifying, by the at least one computer, one or more of the plurality of programs related to the customer onboarding when the customer solution matrix is revised.

12. The computer implemented method of claim 1, further comprising automatically updating, by the at least one computer, the plurality of programs related to the customer onboarding when the customer solution matrix is updated.

13. The computer implemented method of claim 1, wherein said customer revenue spreadsheet includes products and countries together with pricing and costs of each product, and wherein said automatically generating, by the at least one computer, the plurality of programs related to the customer onboarding based on the customer solution matrix comprises:
    automatically generating a customer specific project plan, by the at least one computer, including a plurality of task blocks with predetermined sequence, duration, and dependencies; and
    automatically updating the task blocks, by the at least one computer, when the customer solution matrix is updated.

14. The computer implemented method of claim 1, wherein the plurality of programs related to the customer onboarding includes a legal document program automatically generating legal documents based on each product subscribed to by the customer in each country, tracking terms and conditions negotiated between the company and the customer, and managing signed legal documents.

15. The computer implemented method of claim 1, further comprising automatically generating, by the at least one computer, at least one of a project plan, a legal agreement, a customer onboarding material, a company checklist, a customer checklist, a file interface test case, a customer training material, and a company service setup workflow document based on the customer solution matrix.

16. The computer implemented method of claim 1, further comprising automatically generating, by the at least one computer, an action log.

17. The computer implemented method of claim 16, further comprising embedding, by the computer, the action log within at least one of the plurality of programs related to the customer onboarding.

18. The computer implemented method of claim 17, further comprising synchronizing, by the at least one computer, the at least one of the plurality of programs with the action log.

19. The computer implemented method of claim 16, wherein the action log comprises project information.

20. The computer implemented method of claim 19, wherein the project information comprises a start date, a due date, and a responsible party.

21. The computer implemented method of claim 1, wherein a company user can access the portal via an intranet connection.

22. The computer implemented method of claim 1, wherein a customer user can access the portal via an internet connection.

23. The computer implemented method of claim 1, wherein the company is a bank.

24. The computer implemented method of claim 1, further comprising:
  automatically populating, by the at least one computer, the customer solution matrix based on the customer revenue information and pricing information; and
  automatically generating, by the at least one computer, customer documents and company documents based on predefined templates and the customer solution matrix.

25. The computer implemented method of claim 1, further comprising:
  automatically populating, by the at least one computer, the customer solution matrix based on the customer revenue information, the country information and pricing information;
  automatically generating, by the computer, customer documents and company documents based on predefined templates, the company information, the customer information, the country information and the customer solution matrix.

26. The computer implemented method of claim 1, wherein the customer revenue information comprises at least one of country and product settings for the at least one product subscribed to by the customer in at least one country, transaction volume, standard unit cost, gross estimated business value, net estimated business value, an estimated business value summary, account information, customer product preference information, pricing information, and an amount to charge the customer.

27. A project management and workflow computer system for automating a customer onboarding process across multiple countries and products using a web based implementation portal, the system comprising:
  a user interface configured to receive company information and customer information, said company information including country information for at least one product subscribed to by the customer in at least one country;
  at least one computer configured to include:
    a project management system executing a project management computer application process for managing a project within the onboarding process;
    a workflow management system executing a workflow management computer application process for management of a team within the onboarding process;
    a work scheduler system executing a daily work management computer application process for management of the team and project within the onboarding process;
    an alert messages notification system executing an email notification computer application process to notify the team of events related to the onboarding process;
    a document management system executing a document management computer application process to manage documents created during the onboarding process; and
    an automated implementation templates system executing a document template creation and management computer application process, where the templates are used to create documents in the onboarding process; and
  a plurality of databases in connection with the at least one computer, including:
    a client database storing company information, customer contact details, solution details, account lists and estimated business value spreadsheets;
    a project workflow database storing project plans, workflow templates and implementation templates;
    a documentation database storing product agreements, negotiation rules, implementation documents and document repository; and
    a business parameters database storing product information, country information, matrix information and business rules.

28. The project management and workflow computer system of claim 27, wherein the information stored in the databases is supplied, using the at least one computer, at the user interface.

29. The project management and workflow computer system of claim 27, wherein the project management computer application process is configured to create, using the at least one computer, a project plan based on the information in the databases.

30. The project management and workflow computer system of claim 27, wherein the systems are configured to extract information from the databases using the at least one computer.

31. The project management and workflow computer system of claim 27, wherein the systems are configured to be automatically updated, using the at least one computer, when new information is stored in the databases.

32. The project management and workflow computer system of claim 27, wherein the computer application processes are configured to generate, using the at least one computer, a plurality of customer outputs based on the information stored in the databases.

33. The project management and workflow computer system of claim 27, wherein the customer outputs comprise at least one of a project plan, a solutions account list, a customer agreement and a progress report.

34. The project management and workflow computer system of claim 27, wherein the computer application processes are configured to generate, using the at least one computer, a plurality of company outputs based on the information stored in the databases.

35. The project management and workflow computer system of claim 27, wherein the company outputs comprise at least one of a project plan, an internal status report, a management report, and documentation.

36. The project management and workflow computer system of claim 27, wherein said company information includes revenue information for the customer, wherein said at least one computer is configured to automatically generate a solutions matrix based on the revenue information and pricing information, and wherein said at least one computer is configured to automatically generate company documents and customer documents based on the solutions matrix and predefined templates.

37. The project management and workflow computer system of claim 27, wherein said company information includes revenue information for the customer, wherein said at least one computer is configured to automatically generate a solutions matrix based on the revenue information, the country information and pricing information, and wherein said at least one computer is configured to automatically generate company documents and customer documents based on the solutions matrix, the company information, the customer information, the country information and predefined templates.

38. A global customer onboarding computer system for customer onboarding across multiple countries and products using a web based implementation portal, the system comprising:
   a user interface to access the portal including a company interface configured to receive company information to provide company outputs and customer information to provide customer outputs, said customer information including countries and products selected by the user, and said company information including product information and country information for a plurality of products and countries served by the company;
   at least one customer onboarding computer executing a plurality of customer onboarding computer application processes including at least one of a project management process, a workflow management process, a work scheduler process, an alert message notification process, a document management process, an automated implementation template process, an online search process, and a management information report process, said computer configured to automatically generate a solutions matrix for the customer including a first level comprising a country and product matrix for the countries and products selected by the customer and a second level comprising product details in each country based on the customer information and the company information, and to automatically generate a project plan, legal documents, implementation documents, and an implementation checklist based on the solutions matrix; and
   a plurality of databases, connected to the at least one customer onboarding computer and including a client database, a project workflow database, a documentation database, and a business parameters database, said databases configured to be used for document sharing, storage, retrieval, and ongoing maintenance;
   wherein the at least one customer onboarding computer and the computer application processes are further configured to be automatically updated when new information is stored in the databases.

39. The global customer onboarding computer system of claim 38, wherein the information stored in the databases is supplied, using the at least one computer, at the user interface.

40. The global customer onboarding computer system of claim 38, wherein the project management computer application process is configured to create, using the at least one computer, a project plan based on the information in the databases.

41. The global customer onboarding computer system of claim 38, wherein the customer onboarding computer application processes are configured to extract information from the databases using the at least one computer.

42. The global customer onboarding computer system of claim 38, wherein the customer onboarding computer application processes are configured to be automatically updated, using the at least one computer, when new information is stored in the databases.

43. The global customer onboarding computer system of claim 38, wherein the computer application processes are configured to generate, using the at least one computer, a plurality of customer outputs based on the information stored in the databases.

44. The global customer onboarding computer system of claim 38, wherein the customer outputs comprise at least one of a project plan, a solutions account list, a customer agreement and a progress report.

45. The global customer onboarding computer system of claim 38, wherein the computer application processes are configured to generate, using the at least one computer, a plurality of company outputs based on the information stored in the databases.

46. The global customer onboarding computer system of claim 38, wherein the company outputs comprise at least one of a project plan, an internal status report, a management report, and documentation.

47. The global customer onboarding computer system of claim 38, wherein said plurality of customer onboarding computer application processes further comprises a revenue tracking module configured to compare actual revenue earned by the company from the customer to estimated revenue based on at least one product subscribed to by the customer in at least one country.

48. The global customer onboarding computer system of claim 38, wherein the at least one customer onboarding computer is configured to automatically generate a customer specific project plan based on each product subscribed to by the customer in each country, and wherein said web based implementation portal comprises:
   a project tracker configured to display all tasks within a project as a centralized platform;
   a project dashboard configured to automatically generate at least one of a status report and a progress report at a predetermined time based on the project plan, and to display at least one of a solutions summary, key dates, status, status reports, and a project status monitor on a deal level or a site level; and
   a deals function configured to provide each user with key details of the deals they are responsible for, including project health status and progress.

\* \* \* \* \*